(12) United States Patent
Mullen et al.

(10) Patent No.: US 11,100,431 B2
(45) Date of Patent: Aug. 24, 2021

(54) SYSTEMS AND METHODS FOR MOBILE AUTHORIZATIONS

(75) Inventors: Jeffrey D. Mullen, Pittsburgh, PA (US); Christopher J. Rigatti, Pittsburgh, PA (US); Michael T. Wallace, Payson, AZ (US)

(73) Assignee: DYNAMICS INC.

( * ) Notice: Subject to any disclaimer, the term of this patent is extended or adjusted under 35 U.S.C. 154(b) by 0 days.

(21) Appl. No.: 13/468,571

(22) Filed: May 10, 2012

(65) Prior Publication Data
US 2012/0286928 A1 Nov. 15, 2012

Related U.S. Application Data

(60) Provisional application No. 61/484,547, filed on May 10, 2011, provisional application No. 61/484,566, (Continued)

(51) Int. Cl.
*G06Q 10/00* (2012.01)
*G06Q 20/32* (2012.01)
(Continued)

(52) U.S. Cl.
CPC ............ *G06Q 10/00* (2013.01); *G06Q 20/223* (2013.01); *G06Q 20/322* (2013.01);
(Continued)

(58) Field of Classification Search
CPC .... G06Q 30/02; G06Q 30/06; G06Q 30/0601; G06Q 40/00; G06Q 20/20; G06Q 20/32; G06Q 20/40; G06Q 20/352; G06Q 20/385; G06Q 20/425; G06Q 20/3223; G06Q 20/3255; G06Q 20/3278; G06Q 20/40145; H04L 67/04; H04L 67/34; H04L 41/0869; H04L 41/0806; H04L 63/20; H04B 5/00;
(Continued)

(56) References Cited

U.S. PATENT DOCUMENTS 4,353,064 A 10/1982 Stamm
4,394,654 A 7/1983 Hofmann-Cerfontaine
(Continued)

FOREIGN PATENT DOCUMENTS

JP 05210770 A 8/1993
WO WO9852735 11/1998
(Continued)

OTHER PUBLICATIONS

U.S. Appl. No. 60/594,300, Poidomani et al.
(Continued)

*Primary Examiner* — Adnan Aziz

(57) ABSTRACT

A mobile device may receive security credentials from a contactless device via a contactless communication channel to authorize functions that may be performed by the mobile device. For example, purchase transactions may be authorized to be completed by a mobile device after payment information communicated from a physical payment card to the mobile device is confirmed to match at least a portion of payment information stored within a memory of the mobile device. A mobile device may forward the security credentials to a network entity for remote authorization of a requested function.

20 Claims, 10 Drawing Sheets

Related U.S. Application Data filed on May 10, 2011, provisional application No. 61/484,576, filed on May 10, 2011, provisional application No. 61/484,588, filed on May 10, 2011.

(51) Int. Cl.
| | | |
|---|---|---|
| *G06Q 40/00* | (2012.01) | |
| *G06Q 20/22* | (2012.01) | |
| *G06Q 20/34* | (2012.01) | |
| *G06Q 20/38* | (2012.01) | |
| *G05B 19/00* | (2006.01) | |

(52) U.S. Cl.
CPC ....... *G06Q 20/3278* (2013.01); *G06Q 20/352* (2013.01); *G06Q 20/385* (2013.01); *G06Q 40/00* (2013.01)

(58) Field of Classification Search
CPC ............ H04B 7/00; G06F 8/61; H04W 4/008; H04W 8/183; H04W 76/025; H04W 12/06; H04W 28/18; H04M 1/7253; H04M 2250/02; H04M 2250/06
USPC .................................................. 340/10.1, 5.61
See application file for complete search history.

(56) References Cited

U.S. PATENT DOCUMENTS

| | | | |
|---|---|---|---|
| 4,614,861 A | 9/1986 | Pavlov et al. | |
| 4,667,087 A | 5/1987 | Quintana | |
| 4,701,601 A | 10/1987 | Francini et al. | |
| 4,720,860 A | 1/1988 | Weiss | |
| 4,786,791 A | 11/1988 | Hodama | |
| 4,791,283 A | 12/1988 | Burkhardt | |
| 4,797,542 A | 1/1989 | Hara | |
| 5,038,251 A | 8/1991 | Sugiyama et al. | |
| 5,168,520 A | 12/1992 | Weiss | |
| 5,237,614 A | 8/1993 | Weiss | |
| 5,276,311 A | 1/1994 | Hennige | |
| 5,347,580 A | 9/1994 | Molva et al. | |
| 5,361,062 A | 11/1994 | Weiss et al. | |
| 5,412,199 A | 5/1995 | Finkelstein et al. | |
| 5,434,398 A | 7/1995 | Goldberg | |
| 5,434,405 A | 7/1995 | Finkelstein et al. | |
| 5,478,994 A | 12/1995 | Rahman | |
| 5,479,512 A | 12/1995 | Weiss | |
| 5,484,997 A | 1/1996 | Haynes | |
| 5,485,519 A | 1/1996 | Weiss | |
| 5,585,787 A | 12/1996 | Wallerstein | |
| 5,591,949 A | 1/1997 | Bernstein | |
| 5,608,203 A | 3/1997 | Finkelstein et al. | |
| 5,623,552 A | 4/1997 | Lane | |
| 5,657,388 A | 8/1997 | Weiss | |
| 5,834,747 A | 11/1998 | Cooper | |
| 5,834,756 A | 11/1998 | Gutman et al. | |
| 5,856,661 A | 1/1999 | Finkelstein et al. | |
| 5,864,623 A | 1/1999 | Messina et al. | |
| 5,907,142 A | 5/1999 | Kelsey | |
| 5,913,203 A | 6/1999 | Wong et al. | |
| 5,937,394 A | 8/1999 | Wong et al. | |
| 5,955,021 A | 9/1999 | Tiffany, III | |
| 5,956,699 A | 9/1999 | Wong et al. | |
| 6,025,054 A | 2/2000 | Tiffany, III | |
| 6,045,043 A | 4/2000 | Bashan et al. | |
| 6,076,163 A | 6/2000 | Hoffstein et al. | |
| 6,085,320 A | 7/2000 | Kaliski | |
| 6,095,416 A | 8/2000 | Grant et al. | |
| 6,130,621 A | 10/2000 | Weiss | |
| 6,145,079 A | 11/2000 | Mitty et al. | |
| 6,157,920 A | 12/2000 | Jakobsson et al. | |
| 6,161,181 A | 12/2000 | Haynes, III et al. | |
| 6,176,430 B1 | 1/2001 | Finkelstein et al. | |
| 6,182,894 B1 | 2/2001 | Hackett et al. | |
| 6,189,098 B1 | 2/2001 | Kaliski | |
| 6,199,052 B1 | 3/2001 | Mitty et al. | |
| 6,206,293 B1 | 3/2001 | Gutman et al. | |
| 6,240,184 B1 | 5/2001 | Huynh et al. | |
| 6,241,153 B1 | 6/2001 | Tiffany, III | |
| 6,256,873 B1 | 7/2001 | Tiffany, III | |
| 6,269,163 B1 | 7/2001 | Rivest et al. | |
| 6,286,022 B1 | 9/2001 | Kaliski et al. | |
| 6,308,890 B1 | 10/2001 | Cooper | |
| 6,313,724 B1 | 11/2001 | Osterweil | |
| 6,389,442 B1 | 5/2002 | Yin et al. | |
| 6,393,447 B1 | 5/2002 | Jakobsson et al. | |
| 6,411,715 B1 | 6/2002 | Liskov et al. | |
| 6,446,052 B1 | 9/2002 | Juels | |
| 6,460,141 B1 | 10/2002 | Olden | |
| 6,592,044 B1 | 7/2003 | Wong et al. | |
| 6,607,127 B2 | 8/2003 | Wong | |
| 6,609,654 B1 | 8/2003 | Anderson et al. | |
| 6,631,849 B2 | 10/2003 | Blossom | |
| 6,655,585 B2 | 12/2003 | Shinn | |
| 6,681,988 B2 | 1/2004 | Stack et al. | |
| 6,705,520 B1 | 3/2004 | Pitroda et al. | |
| 6,755,341 B1 | 6/2004 | Wong et al. | |
| 6,764,005 B2 | 7/2004 | Cooper | |
| 6,769,618 B1 | 8/2004 | Finkelstein | |
| 6,805,288 B2 | 10/2004 | Routhenstein et al. | |
| 6,811,082 B2 | 11/2004 | Wong | |
| 6,813,354 B1 | 11/2004 | Jakobsson et al. | |
| 6,817,532 B2 | 11/2004 | Finkelstein | |
| 6,873,974 B1 | 3/2005 | Schutzer | |
| 6,902,116 B2 | 6/2005 | Finkelstein | |
| 6,970,070 B2 | 11/2005 | Juels et al. | |
| 6,980,969 B1 | 12/2005 | Tuchler et al. | |
| 6,985,583 B1 | 1/2006 | Brainard et al. | |
| 6,991,155 B2 | 1/2006 | Burchette, Jr. | |
| 7,013,030 B2 | 3/2006 | Wong et al. | |
| 7,035,443 B2 | 4/2006 | Wong | |
| 7,039,223 B2 | 5/2006 | Wong | |
| 7,044,394 B2 | 5/2006 | Brown | |
| 7,051,929 B2 | 5/2006 | Li | |
| 7,083,094 B2 | 8/2006 | Cooper | |
| 7,100,049 B2 | 8/2006 | Gasparini et al. | |
| 7,100,821 B2 | 9/2006 | Rasti | |
| 7,111,172 B1 | 9/2006 | Duane et al. | |
| 7,114,652 B2 | 10/2006 | Moullette et al. | |
| 7,136,514 B1 | 11/2006 | Wong | |
| 7,140,550 B2 | 11/2006 | Ramachandran | |
| 7,163,153 B2 | 1/2007 | Blossom | |
| 7,195,154 B2 | 3/2007 | Routhenstein | |
| 7,197,639 B1 | 3/2007 | Juels et al. | |
| 7,219,368 B2 | 5/2007 | Juels et al. | |
| 7,225,537 B2 | 6/2007 | Reed | |
| 7,225,994 B2 | 6/2007 | Finkelstein | |
| 7,246,752 B2 | 7/2007 | Brown | |
| 7,298,243 B2 | 11/2007 | Juels et al. | |
| 7,334,732 B2 | 2/2008 | Cooper | |
| 7,337,326 B2 | 2/2008 | Palmer et al. | |
| 7,346,775 B2 | 3/2008 | Gasparini et al. | |
| 7,356,696 B1 | 4/2008 | Jakobsson et al. | |
| 7,357,319 B1 | 4/2008 | Lin et al. | |
| 7,359,507 B2 | 4/2008 | Kaliski | |
| 7,360,688 B1 | 4/2008 | Harris | |
| 7,363,494 B2 | 4/2008 | Brainard et al. | |
| 7,380,710 B2 | 6/2008 | Brown | |
| 7,398,253 B1 | 7/2008 | Pinnell | |
| 7,404,087 B2 | 7/2008 | Teunen | |
| 7,424,570 B2 | 9/2008 | D'Albore et al. | |
| 7,427,033 B1 | 9/2008 | Roskind | |
| 7,454,349 B2 | 11/2008 | Teunen et al. | |
| 7,461,250 B1 | 12/2008 | Duane et al. | |
| 7,461,399 B2 | 12/2008 | Juels et al. | |
| 7,472,093 B2 | 12/2008 | Juels | |
| 7,472,829 B2 | 1/2009 | Brown | |
| 7,494,055 B2 | 2/2009 | Fernandes et al. | |
| 7,494,067 B1 * | 2/2009 | Zhu .................. | G06Q 20/20 235/435 |
| 7,502,467 B2 | 3/2009 | Brainard et al. | |
| 7,502,933 B2 | 3/2009 | Jakobsson et al. | |
| 7,503,485 B1 | 3/2009 | Routhenstein | |
| 7,516,492 B1 | 4/2009 | Nisbet et al. | |

(56) References Cited

U.S. PATENT DOCUMENTS

| | | |
|---|---|---|
| 7,523,301 B2 | 4/2009 | Nisbet et al. |
| 7,530,495 B2 | 5/2009 | Cooper |
| 7,532,104 B2 | 5/2009 | Juels |
| 7,543,739 B2 | 6/2009 | Brown et al. |
| 7,559,464 B2 | 7/2009 | Routhenstein |
| 7,562,221 B2 | 7/2009 | Nystrom et al. |
| 7,562,222 B2 | 7/2009 | Gasparini et al. |
| 7,580,898 B2 | 8/2009 | Brown et al. |
| 7,584,153 B2 | 9/2009 | Brown et al. |
| 7,591,426 B2 | 9/2009 | Osterweil et al. |
| 7,591,427 B2 | 9/2009 | Osterweil |
| 7,597,250 B2 * | 10/2009 | Finn .................. B60R 25/25 235/375 |
| 7,602,904 B2 | 10/2009 | Juels et al. |
| 7,631,804 B2 | 12/2009 | Brown |
| 7,639,537 B2 | 12/2009 | Sepe et al. |
| 7,641,124 B2 | 1/2010 | Brown et al. |
| 7,660,902 B2 | 2/2010 | Graham et al. |
| 7,784,687 B2 | 8/2010 | Mullen et al. |
| 7,793,851 B2 | 9/2010 | Mullen |
| 7,828,207 B2 | 11/2010 | Cooper |
| 7,828,220 B2 | 11/2010 | Mullen |
| 7,931,195 B2 | 4/2011 | Mullen |
| 7,942,337 B2 * | 5/2011 | Jain ......................... 235/492 |
| 7,954,705 B2 | 6/2011 | Mullen |
| D643,063 S | 8/2011 | Mullen et al. |
| 8,011,577 B2 | 9/2011 | Mullen et al. |
| 8,020,775 B2 | 9/2011 | Mullen et al. |
| 8,066,191 B1 | 11/2011 | Cloutier et al. |
| D651,237 S | 12/2011 | Mullen et al. |
| D651,238 S | 12/2011 | Mullen et al. |
| 8,074,877 B2 | 12/2011 | Mullen et al. |
| D651,644 S | 1/2012 | Mullen et al. |
| D652,075 S | 1/2012 | Mullen et al. |
| D652,076 S | 1/2012 | Mullen et al. |
| D652,448 S | 1/2012 | Mullen et al. |
| D652,449 S | 1/2012 | Mullen et al. |
| D652,450 S | 1/2012 | Mullen et al. |
| D652,867 S | 1/2012 | Mullen et al. |
| D653,288 S | 1/2012 | Mullen et al. |
| 8,095,113 B2 * | 1/2012 | Kean ................. G06F 21/31 455/406 |
| 8,172,148 B1 | 5/2012 | Cloutier et al. |
| D665,022 S | 8/2012 | Mullen et al. |
| D665,447 S | 8/2012 | Mullen et al. |
| D666,241 S | 8/2012 | Mullen et al. |
| 8,282,007 B1 | 10/2012 | Cloutier et al. |
| 8,286,876 B2 | 10/2012 | Mullen et al. |
| D670,759 S | 11/2012 | Mullen et al. |
| 8,302,872 B2 | 11/2012 | Mullen |
| D672,389 S | 12/2012 | Mullen et al. |
| 8,322,623 B1 | 12/2012 | Mullen et al. |
| D674,013 S | 1/2013 | Mullen et al. |
| 8,348,172 B1 | 1/2013 | Cloutier et al. |
| 8,352,323 B2 * | 1/2013 | Fisher ............................ 705/16 |
| 8,382,000 B2 | 2/2013 | Mullen et al. |
| 8,393,545 B1 * | 3/2013 | Mullen ................ G06Q 20/341 235/487 |
| 8,393,546 B1 | 3/2013 | Yen et al. |
| 8,413,892 B2 | 4/2013 | Mullen et al. |
| 8,424,773 B2 | 4/2013 | Mullen et al. |
| 8,459,548 B2 | 6/2013 | Mullen et al. |
| D687,094 S | 7/2013 | Mullen et al. |
| 8,485,437 B2 | 7/2013 | Mullen et al. |
| 8,485,446 B1 | 7/2013 | Mullen et al. |
| 8,511,574 B1 | 8/2013 | Yen et al. |
| 8,517,276 B2 | 8/2013 | Mullen et al. |
| 8,523,059 B1 | 9/2013 | Mullen et al. |
| 8,561,894 B1 | 10/2013 | Mullen et al. |
| 8,565,723 B2 * | 10/2013 | Cox ................. G06F 21/31 455/410 |
| 8,567,679 B1 | 10/2013 | Mullen et al. |
| 8,573,503 B1 | 11/2013 | Cloutier et al. |
| 8,579,203 B1 | 11/2013 | Lambeth et al. |
| 8,590,796 B1 | 11/2013 | Cloutier et al. |
| 8,602,312 B2 | 12/2013 | Cloutier et al. |
| 8,608,083 B2 | 12/2013 | Mullen et al. |
| 8,622,309 B1 | 1/2014 | Mullen et al. |
| 8,668,143 B2 | 3/2014 | Mullen et al. |
| 8,727,219 B1 | 5/2014 | Mullen |
| 8,733,638 B2 | 5/2014 | Mullen et al. |
| 8,746,579 B1 | 6/2014 | Cloutier et al. |
| 8,757,483 B1 | 6/2014 | Mullen et al. |
| 8,757,499 B2 | 6/2014 | Cloutier et al. |
| 8,814,050 B1 | 8/2014 | Mullen et al. |
| 8,875,999 B2 | 11/2014 | Mullen et al. |
| 8,881,989 B2 | 11/2014 | Mullen et al. |
| 8,918,855 B2 * | 12/2014 | Singh et al. .................. 726/9 |
| 8,931,703 B1 | 1/2015 | Mullen et al. |
| 8,944,333 B1 | 2/2015 | Mullen et al. |
| 8,973,824 B2 | 3/2015 | Mullen et al. |
| 9,004,368 B2 | 4/2015 | Mullen et al. |
| 9,010,630 B2 | 4/2015 | Mullen et al. |
| 9,053,398 B1 | 6/2015 | Cloutier |
| 9,064,255 B1 | 6/2015 | Mullen et al. |
| 9,129,270 B2 * | 9/2015 | Spodak ................ G06Q 20/105 |
| 9,292,843 B1 | 3/2016 | Mullen et al. |
| 9,306,666 B1 | 4/2016 | Zhang et al. |
| 9,329,619 B1 | 5/2016 | Cloutier |
| 9,361,569 B2 | 6/2016 | Mullen et al. |
| 9,373,069 B2 | 6/2016 | Cloutier et al. |
| 9,384,438 B2 | 7/2016 | Mullen et al. |
| 9,547,816 B2 | 1/2017 | Mullen et al. |
| 9,639,796 B2 | 5/2017 | Mullen et al. |
| 9,646,240 B1 | 5/2017 | Mullen et al. |
| 9,652,436 B1 | 5/2017 | Yen et al. |
| 9,684,861 B2 | 6/2017 | Mullen et al. |
| D792,511 S | 7/2017 | Mullen et al. |
| D792,512 S | 7/2017 | Mullen et al. |
| D792,513 S | 7/2017 | Mullen et al. |
| 9,697,454 B2 | 7/2017 | Mullen et al. |
| 9,704,088 B2 | 7/2017 | Mullen et al. |
| 9,704,089 B2 | 7/2017 | Mullen et al. |
| 9,721,201 B1 | 8/2017 | Mullen et al. |
| 9,727,813 B2 | 8/2017 | Mullen et al. |
| 9,805,297 B2 | 10/2017 | Mullen et al. |
| 9,818,125 B2 | 11/2017 | Mullen et al. |
| 9,836,680 B1 | 12/2017 | Cloutier |
| 9,852,368 B1 | 12/2017 | Yen et al. |
| 9,875,437 B2 | 1/2018 | Cloutier et al. |
| 9,928,456 B1 | 3/2018 | Cloutier et al. |
| 9,953,255 B1 | 4/2018 | Yen et al. |
| 10,022,884 B1 | 7/2018 | Cloutier |
| 10,032,100 B2 | 7/2018 | Mullen et al. |
| 10,055,614 B1 | 8/2018 | Cloutier et al. |
| 10,095,970 B1 | 10/2018 | Mullen |
| 10,095,974 B1 | 10/2018 | Mullen et al. |
| 10,169,692 B2 | 1/2019 | Mullen et al. |
| 10,176,419 B1 | 1/2019 | Cloutier et al. |
| 10,176,423 B1 | 1/2019 | Mullen et al. |
| 10,181,097 B1 | 1/2019 | Mullen et al. |
| 10,198,687 B2 | 2/2019 | Mullen et al. |
| 10,223,631 B2 | 3/2019 | Mullen et al. |
| 10,255,545 B2 | 4/2019 | Mullen et al. |
| 10,325,199 B2 | 6/2019 | Mullen et al. |
| 10,430,704 B2 | 10/2019 | Mullen et al. |
| 10,467,521 B2 | 11/2019 | Mullen et al. |
| 10,482,363 B1 | 11/2019 | Cloutier et al. |
| 10,496,918 B2 | 12/2019 | Mullen et al. |
| 10,504,105 B2 | 12/2019 | Mullen et al. |
| 10,579,920 B2 | 3/2020 | Mullen et al. |
| 10,693,263 B1 | 6/2020 | Mullen et al. |
| 2001/0034702 A1 | 10/2001 | Mockett et al. |
| 2001/0047335 A1 | 11/2001 | Arndt et al. |
| 2002/0059114 A1 | 5/2002 | Cockrill et al. |
| 2002/0082989 A1 | 6/2002 | Fife et al. |
| 2002/0096570 A1 | 7/2002 | Wong et al. |
| 2002/0120583 A1 | 8/2002 | Keresman, III et al. |
| 2003/0034388 A1 | 2/2003 | Routhenstein et al. |
| 2003/0052168 A1 | 3/2003 | Wong |
| 2003/0057278 A1 | 3/2003 | Wong |
| 2003/0116635 A1 | 6/2003 | Taban |
| 2003/0152253 A1 | 8/2003 | Wong |
| 2003/0163287 A1 | 8/2003 | Vock et al. |

(56) References Cited

U.S. PATENT DOCUMENTS

| | | |
|---|---|---|
| 2003/0173409 A1 | 9/2003 | Vogt et al. |
| 2003/0179909 A1 | 9/2003 | Wong et al. |
| 2003/0179910 A1 | 9/2003 | Wong |
| 2003/0226899 A1 | 12/2003 | Finkelstein |
| 2004/0035942 A1 | 2/2004 | Silverman |
| 2004/0054574 A1 | 3/2004 | Kaufman et al. |
| 2004/0127256 A1* | 7/2004 | Goldthwaite et al. ........ 455/558 |
| 2004/0133787 A1 | 7/2004 | Doughty |
| 2004/0162732 A1 | 8/2004 | Rahim et al. |
| 2004/0172535 A1 | 9/2004 | Jakobsson |
| 2004/0177045 A1 | 9/2004 | Brown |
| 2005/0043997 A1 | 2/2005 | Sohata et al. |
| 2005/0080747 A1 | 4/2005 | Anderson et al. |
| 2005/0086160 A1 | 4/2005 | Wong et al. |
| 2005/0086177 A1 | 4/2005 | Anderson et al. |
| 2005/0116026 A1 | 6/2005 | Burger et al. |
| 2005/0119940 A1 | 6/2005 | Concilio et al. |
| 2005/0154643 A1 | 7/2005 | Doan et al. |
| 2005/0228959 A1 | 10/2005 | D'Albore et al. |
| 2006/0000900 A1 | 1/2006 | Fernandes et al. |
| 2006/0037073 A1 | 2/2006 | Juels et al. |
| 2006/0041759 A1 | 2/2006 | Kaliski et al. |
| 2006/0085328 A1 | 4/2006 | Cohen et al. |
| 2006/0091223 A1 | 5/2006 | Zellner |
| 2006/0161435 A1 | 7/2006 | Atef et al. |
| 2006/0163353 A1 | 7/2006 | Moulette et al. |
| 2006/0165060 A1* | 7/2006 | Dua ....................... G06Q 20/20 370/352 |
| 2006/0174104 A1 | 8/2006 | Crichton et al. |
| 2006/0196931 A1 | 9/2006 | Holtmanns et al. |
| 2006/0219776 A1* | 10/2006 | Finn ....................... B60R 25/25 235/380 |
| 2006/0256961 A1 | 11/2006 | Brainard et al. |
| 2007/0034700 A1 | 2/2007 | Poidomani et al. |
| 2007/0106892 A1* | 5/2007 | Engberg ................ G06Q 20/02 713/168 |
| 2007/0114274 A1 | 5/2007 | Gibbs et al. |
| 2007/0124321 A1 | 5/2007 | Szydlo |
| 2007/0152070 A1 | 7/2007 | D'Albore |
| 2007/0152072 A1 | 7/2007 | Frallicciardi et al. |
| 2007/0153487 A1 | 7/2007 | Frallicciardi et al. |
| 2007/0174614 A1 | 7/2007 | Duane et al. |
| 2007/0192249 A1 | 8/2007 | Biffle et al. |
| 2007/0241183 A1 | 10/2007 | Brown et al. |
| 2007/0241201 A1 | 10/2007 | Brown et al. |
| 2007/0256123 A1 | 11/2007 | Duane et al. |
| 2007/0278291 A1* | 12/2007 | Rans .................... G06Q 20/341 235/380 |
| 2007/0291753 A1 | 12/2007 | Romano |
| 2008/0005510 A1 | 1/2008 | Sepe et al. |
| 2008/0008315 A1 | 1/2008 | Fontana et al. |
| 2008/0008322 A1 | 1/2008 | Fontana et al. |
| 2008/0010675 A1 | 1/2008 | Massascusa et al. |
| 2008/0016351 A1 | 1/2008 | Fontana et al. |
| 2008/0019507 A1 | 1/2008 | Fontana et al. |
| 2008/0028447 A1 | 1/2008 | O'Malley et al. |
| 2008/0029607 A1 | 2/2008 | Mullen |
| 2008/0035738 A1 | 2/2008 | Mullen |
| 2008/0040271 A1 | 2/2008 | Hammad et al. |
| 2008/0040276 A1 | 2/2008 | Hammad et al. |
| 2008/0054068 A1 | 3/2008 | Mullen |
| 2008/0054079 A1 | 3/2008 | Mullen |
| 2008/0054081 A1 | 3/2008 | Mullen |
| 2008/0058016 A1 | 3/2008 | Di Maggio et al. |
| 2008/0059379 A1 | 3/2008 | Ramaci et al. |
| 2008/0065555 A1 | 3/2008 | Mullen |
| 2008/0096326 A1 | 4/2008 | Reed |
| 2008/0126398 A1 | 5/2008 | Cimino |
| 2008/0128515 A1 | 6/2008 | Di Iorio |
| 2008/0148394 A1 | 6/2008 | Poidomani et al. |
| 2008/0201264 A1 | 8/2008 | Brown et al. |
| 2008/0209550 A1 | 8/2008 | Di Iorio |
| 2008/0288699 A1 | 11/2008 | Chichierchia |
| 2008/0294930 A1 | 11/2008 | Varone et al. |
| 2008/0302869 A1 | 12/2008 | Mullen |
| 2008/0302876 A1 | 12/2008 | Mullen |
| 2008/0302877 A1 | 12/2008 | Musella et al. |
| 2009/0013122 A1 | 1/2009 | Sepe et al. |
| 2009/0036147 A1 | 2/2009 | Romano |
| 2009/0046522 A1 | 2/2009 | Sepe et al. |
| 2009/0070272 A1* | 3/2009 | Jain ................ G06K 19/07739 705/75 |
| 2009/0108064 A1 | 4/2009 | Fernandes et al. |
| 2009/0132362 A1* | 5/2009 | Fisher et al. .................... 705/14 |
| 2009/0143104 A1* | 6/2009 | Loh et al. ...................... 455/558 |
| 2009/0150295 A1 | 6/2009 | Hatch et al. |
| 2009/0152365 A1 | 6/2009 | Li et al. |
| 2009/0159663 A1 | 6/2009 | Mullen et al. |
| 2009/0159667 A1 | 6/2009 | Mullen et al. |
| 2009/0159668 A1 | 6/2009 | Mullen et al. |
| 2009/0159669 A1 | 6/2009 | Mullen et al. |
| 2009/0159670 A1 | 6/2009 | Mullen et al. |
| 2009/0159671 A1 | 6/2009 | Mullen et al. |
| 2009/0159672 A1 | 6/2009 | Mullen et al. |
| 2009/0159673 A1 | 6/2009 | Mullen et al. |
| 2009/0159680 A1 | 6/2009 | Mullen et al. |
| 2009/0159681 A1 | 6/2009 | Mullen et al. |
| 2009/0159682 A1 | 6/2009 | Mullen et al. |
| 2009/0159688 A1 | 6/2009 | Mullen et al. |
| 2009/0159689 A1 | 6/2009 | Mullen et al. |
| 2009/0159690 A1 | 6/2009 | Mullen et al. |
| 2009/0159696 A1 | 6/2009 | Mullen |
| 2009/0159697 A1 | 6/2009 | Mullen et al. |
| 2009/0159698 A1 | 6/2009 | Mullen et al. |
| 2009/0159699 A1 | 6/2009 | Mullen et al. |
| 2009/0159700 A1 | 6/2009 | Mullen et al. |
| 2009/0159701 A1 | 6/2009 | Mullen et al. |
| 2009/0159702 A1 | 6/2009 | Mullen |
| 2009/0159703 A1 | 6/2009 | Mullen et al. |
| 2009/0159704 A1 | 6/2009 | Mullen et al. |
| 2009/0159705 A1 | 6/2009 | Mullen et al. |
| 2009/0159706 A1 | 6/2009 | Mullen et al. |
| 2009/0159707 A1 | 6/2009 | Mullen et al. |
| 2009/0159708 A1 | 6/2009 | Mullen et al. |
| 2009/0159709 A1 | 6/2009 | Mullen |
| 2009/0159710 A1 | 6/2009 | Mullen et al. |
| 2009/0159711 A1 | 6/2009 | Mullen et al. |
| 2009/0159712 A1 | 6/2009 | Mullen et al. |
| 2009/0159713 A1 | 6/2009 | Mullen et al. |
| 2009/0160617 A1 | 6/2009 | Mullen et al. |
| 2009/0170432 A1 | 7/2009 | Lortz |
| 2009/0191811 A1* | 7/2009 | Griffin et al. ................. 455/41.1 |
| 2009/0210308 A1* | 8/2009 | Toomer et al. ................. 705/16 |
| 2009/0222383 A1* | 9/2009 | Tato et al. ....................... 705/71 |
| 2009/0242648 A1 | 10/2009 | Di Sirio et al. |
| 2009/0244858 A1 | 10/2009 | Di Sirio et al. |
| 2009/0253460 A1 | 10/2009 | Varone et al. |
| 2009/0255996 A1 | 10/2009 | Brown et al. |
| 2009/0290704 A1 | 11/2009 | Cimino |
| 2009/0303885 A1 | 12/2009 | Longo |
| 2009/0307132 A1* | 12/2009 | Phillips .......................... 705/41 |
| 2009/0308921 A1 | 12/2009 | Mullen |
| 2010/0019033 A1* | 1/2010 | Jolivet ................... G06K 7/0008 235/380 |
| 2010/0023449 A1 | 1/2010 | Skowronek et al. |
| 2010/0051689 A1* | 3/2010 | Diamond ............... G06Q 20/10 235/380 |
| 2010/0063895 A1* | 3/2010 | Dominguez ........... G06Q 20/02 705/26.1 |
| 2010/0082445 A1* | 4/2010 | Hodge ................... G06Q 20/10 705/21 |
| 2010/0131413 A1* | 5/2010 | Kranzley .............. G06Q 20/349 705/66 |
| 2010/0153269 A1* | 6/2010 | McCabe ........................ 705/44 |
| 2010/0260388 A1* | 10/2010 | Garrett et al. ................. 382/124 |
| 2010/0303230 A1* | 12/2010 | Taveau ................... G06Q 20/02 380/30 |
| 2010/0304670 A1 | 12/2010 | Shuo |
| 2011/0028184 A1 | 2/2011 | Cooper |
| 2011/0218911 A1* | 9/2011 | Spodak .......................... 705/41 |
| 2011/0264543 A1* | 10/2011 | Taveau ................... G06Q 20/12 705/23 |

(56) References Cited

U.S. PATENT DOCUMENTS

| | | |
|---|---|---|
| 2011/0270757 A1* | 11/2011 | Hammad ............... G06Q 30/06 705/44 |
| 2011/0272465 A1 | 11/2011 | Mullen et al. |
| 2011/0272466 A1 | 11/2011 | Mullen et al. |
| 2011/0272467 A1 | 11/2011 | Mullen et al. |
| 2011/0272471 A1 | 11/2011 | Mullen |
| 2011/0272472 A1 | 11/2011 | Mullen |
| 2011/0272473 A1 | 11/2011 | Mullen et al. |
| 2011/0272474 A1 | 11/2011 | Mullen et al. |
| 2011/0272475 A1 | 11/2011 | Mullen et al. |
| 2011/0272476 A1 | 11/2011 | Mullen et al. |
| 2011/0272477 A1 | 11/2011 | Mullen et al. |
| 2011/0272478 A1 | 11/2011 | Mullen |
| 2011/0272479 A1 | 11/2011 | Mullen |
| 2011/0272480 A1 | 11/2011 | Mullen et al. |
| 2011/0272481 A1 | 11/2011 | Mullen et al. |
| 2011/0272482 A1 | 11/2011 | Mullen et al. |
| 2011/0272483 A1 | 11/2011 | Mullen et al. |
| 2011/0272484 A1 | 11/2011 | Mullen et al. |
| 2011/0276380 A1 | 11/2011 | Mullen et al. |
| 2011/0276381 A1 | 11/2011 | Mullen et al. |
| 2011/0276416 A1 | 11/2011 | Mullen et al. |
| 2011/0276424 A1 | 11/2011 | Mullen |
| 2011/0276425 A1 | 11/2011 | Mullen |
| 2011/0276436 A1 | 11/2011 | Mullen et al. |
| 2011/0276437 A1 | 11/2011 | Mullen et al. |
| 2011/0278364 A1 | 11/2011 | Mullen et al. |
| 2011/0282753 A1 | 11/2011 | Mullen et al. |
| 2011/0284632 A1 | 11/2011 | Mullen et al. |
| 2011/0284640 A1 | 11/2011 | Mullen et al. |
| 2011/0320293 A1* | 12/2011 | Khan ................ G06Q 20/0457 705/16 |
| 2012/0028702 A1 | 2/2012 | Mullen et al. |
| 2012/0037709 A1 | 2/2012 | Cloutier et al. |
| 2012/0150601 A1* | 6/2012 | Fisher .................... H04W 4/21 705/14.23 |
| 2012/0197708 A1 | 8/2012 | Mullen et al. |
| 2012/0209744 A1 | 8/2012 | Mullen et al. |
| 2012/0254031 A1* | 10/2012 | Walker et al. .................. 705/42 |
| 2012/0254037 A1 | 10/2012 | Mullen |
| 2012/0286037 A1 | 11/2012 | Mullen et al. |
| 2012/0286928 A1 | 11/2012 | Mullen et al. |
| 2012/0286936 A1 | 11/2012 | Mullen et al. |
| 2012/0290449 A1 | 11/2012 | Mullen et al. |
| 2012/0290472 A1 | 11/2012 | Mullen et al. |
| 2012/0318871 A1 | 12/2012 | Mullen et al. |
| 2012/0326013 A1 | 12/2012 | Cloutier et al. |
| 2013/0020396 A1 | 1/2013 | Mullen et al. |
| 2013/0282573 A1 | 10/2013 | Mullen et al. |
| 2013/0282575 A1 | 10/2013 | Mullen et al. |
| 2014/0054384 A1 | 2/2014 | Cloutier et al. |
| 2015/0186766 A1 | 7/2015 | Mullen et al. |
| 2016/0162713 A1 | 6/2016 | Cloutier et al. |
| 2016/0180209 A1 | 6/2016 | Mullen et al. |
| 2016/0239735 A1 | 8/2016 | Mullen et al. |
| 2016/0283837 A1 | 9/2016 | Mullen et al. |
| 2016/0307085 A1 | 10/2016 | Mullen et al. |
| 2016/0335529 A1 | 11/2016 | Mullen et al. |
| 2016/0342876 A1 | 11/2016 | Mullen et al. |
| 2016/0342877 A1 | 11/2016 | Mullen et al. |
| 2016/0342878 A1 | 11/2016 | Mullen et al. |
| 2016/0342879 A1 | 11/2016 | Mullen et al. |
| 2016/0342880 A1 | 11/2016 | Mullen et al. |
| 2017/0286817 A1 | 10/2017 | Mullen et al. |
| 2017/0300796 A1 | 10/2017 | Mullen et al. |
| 2018/0053079 A1 | 2/2018 | Cloutier et al. |
| 2018/0060881 A1 | 3/2018 | Mullen et al. |
| 2019/0042903 A1 | 2/2019 | Cloutier et al. |
| 2019/0065928 A1 | 2/2019 | Mullen et al. |
| 2019/0197387 A1 | 6/2019 | Mullen et al. |
| 2019/0340484 A1 | 11/2019 | Mullen et al. |
| 2020/0082383 A1 | 3/2020 | Mullen et al. |

FOREIGN PATENT DOCUMENTS

| | | |
|---|---|---|
| WO | WO0247019 | 6/2002 |
| WO | WO06066322 | 6/2006 |
| WO | WO06080929 | 8/2006 |
| WO | WO06105092 | 10/2006 |
| WO | WO06116772 | 11/2006 |
| WO | WO08064403 | 6/2008 |

OTHER PUBLICATIONS

U.S. Appl. No. 60/675,388, Poidomani et al.
The Bank Credit Card Business. Second Edition, American Bankers Association, Washington, D.C., 1996.
A Day in the Life of a Flux Reversal. http://www.phrack.org/issues.html?issue=37&id=6#article. As viewed on Apr. 12, 2010.
Dynamic Virtual Credit Card Numbers. http://homes.cerias.purdue.edu/~jtli/paper/fc07.pdf. As viewed on Apr. 12, 2010.
USPTO, International Search Report, dated Apr. 28, 2009.
English translation of JP 05210770 A.
USPTO, International Search Report, dated Oct. 16, 2012.
English translation of JP 05210770.

* cited by examiner

SYSTEMS AND METHODS FOR MOBILE AUTHORIZATIONS

CROSS-REFERENCE TO RELATED APPLICATION

This application claims the benefit of U.S. Provisional Patent Application Nos. 61/484,547, titled "SYSTEMS AND DEVICES FOR MOBILE PAYMENT ACCEPTANCE," filed May 10, 2011, 61/484,566, titled "SYSTEMS AND METHODS FOR A MOBILE ELECTRONIC WALLET," filed May 10, 2011, 61/484,576, titled "SYSTEMS AND METHODS FOR MOBILE AUTHORIZATIONS," filed May 10, 2011, and 61/484,588, titled "SYSTEMS AND METHODS FOR CONTACTLESS COMMUNICATION MECHANISMS FOR CARDS AND MOBILE DEVICES," filed May 10, 2011 all of which are hereby incorporated by reference herein in their entirety.

BACKGROUND OF THE INVENTION

This invention relates to mobile devices and related systems.

SUMMARY OF THE INVENTION

A mobile device may be used as an authorization terminal to conduct transactions (e.g., purchase transactions) using the mobile device. Purchase transactions may, for example, be completed by a mobile device using payment information stored within a memory of the mobile device. In order to conduct a purchase transaction, a processor of a mobile device may, for example, first require security credentials to authorize a purchase transaction. Security credentials may, for example, be any type of information that may be communicated to a mobile device by a contactless device using a contactless communication channel (e.g., an RFID communication channel).

Security credentials may, for example, be payment information that may be communicated to a processor of a mobile device by a payment card (e.g., a powered or a non-powered payment card). Accordingly, for example, if payment information communicated to a processor of a mobile device by a physical payment card matches payment information previously stored within a memory of the mobile device, the mobile device may authorize the purchase transaction.

As per an example, a mobile device may receive payment information (e.g., a payment account number and an expiration date) from a payment card via a contactless communication channel and may store such payment information within a memory of the mobile device for future use. Prior to conducting a requested purchase transaction, a processor of a mobile device may first require that a physical payment card be used to authorize the purchase transaction. Accordingly, for example, the same physical payment card that was used to originally communicate payment information to a processor of the mobile device may be required to once again communicate payment information in order to authorize the purchase transaction. Upon verification that the newly communicated payment information matches at least a portion of payment information contained within a memory of the mobile device, the mobile device may authorize the payment transaction.

A powered card may, for example, communicate security credentials that may contain a dynamic security code and other information (e.g., at least a portion of a payment account number or a cardholder's name). Accordingly, for example, an application executed by a processor of a mobile device may synchronize with a dynamic security code generation algorithm that may be executed by a processor of the powered card. In so doing, for example, a processor of the mobile device may generate a dynamic security code in accordance with the security code generation algorithm and may compare the generated dynamic security code to a security code received from a powered card during authorization of a purchase transaction. If a match exists, for example, the purchase transaction may be authorized by the mobile device.

A mobile device may, for example, communicate security credentials received from a physical card via a contactless communication channel to a network entity (e.g., an authorization server). Accordingly, for example, the authorization server may analyze the received security credentials and may either confirm or deny that the security credentials are authentic. A message may, for example, be communicated from the authorization server to the mobile device to either authorize or deny the purchase transaction.

A mobile device may, for example, arrange security credentials (e.g., payment information) stored within a memory of the mobile device as one or more virtual payment cards that may be provided on a display of the mobile device. Accordingly, for example, a user of a mobile device may select one or more virtual cards from a displayed list of virtual cards for use during a purchase transaction. In so doing, for example, a user may retrieve a physical payment card from his or her wallet that corresponds to the virtual payment card selected for use and may communicate (e.g., via a contactless communication channel) payment information from the physical payment card to a processor of the mobile device. Upon verification that the communicated payment information matches at least a portion of payment information stored within a memory of the mobile device, a processor of the mobile device may authorize the purchase transaction using the stored payment information.

A physical payment card may, for example, be used as a master physical payment card to authorize purchase transactions that are to be completed by the mobile device using stored payment information that does not match payment information received from the physical payment card. For example, a master physical payment card may be associated with a particular issuer and a mobile device may store several virtual cards within a memory of the mobile device having the same issuer. Upon receipt of payment information from the master physical payment card, a processor of a mobile device may authorize purchase transactions using one or more virtual cards stored within a memory of the mobile device that may share the same issuer as the issuer of the master physical payment card.

Other devices (e.g., RFID enabled keys) may, for example, communicate security credentials via a contactless communication channel to a processor of a mobile device to authorize other transactions (e.g., non-purchase transactions) that may be conducted by the mobile device. Accordingly, for example, a processor of a mobile device may communicate commands to a wireless device (e.g., a user's car) to perform certain functions (e.g., start the engine of the user's car). In so doing, for example, a user may present an ignition key to the mobile device to communicate security credentials (e.g., a key code matched to the user's car) from the ignition key to the mobile device to authorize the requested function. Upon verification that the key code matches the key code of the user's car, for example, a processor of the mobile device may authorize the requested function and may communicate the associated command to the user's car to execute the requested function.

Any function may, for example, be authorized to be performed by a processor of a mobile device. Accordingly, for example, any decision to perform a function by a mobile device may be authorized by a processor of the mobile device. In so doing, for example, any function (e.g., checking a balance of a banking account or transitioning from paper bank statements to e-statements) that may be performed by a processor of a mobile device may be authorized by the processor upon verification that security credentials (e.g., a bank account number) communicated to the processor from a contactless communication device (e.g., a bank card associated with the bank account) matches at least a portion of security credentials (e.g., banking information) that may be stored within a memory of the mobile device.

Any mobile device, such as a laptop computer, a mobile telephonic device (e.g., a cellular phone), a PDA, an MP3 player, or a positioning device (e.g., a GPS) may be an authorization terminal. Accordingly, for example, any mobile device may accept payment information from any physical payment card, store such payment information within a memory of the mobile device, require that the same (or associated) physical payment card communicate payment information to a processor of the mobile device, and complete a purchase transaction with network entities (e.g., an issuer or a payment server) upon verification that the communicated payment information matches at least a portion of payment information stored within a memory of the mobile device.

A mobile device may include a contactless communication device. Accordingly, for example, a mobile device may communicate with any card having contactless communication capability. For example, a card (e.g., a non-powered card) may include a near-field communication device (e.g., an RFID tag) that may communicate with a contactless communication device of a mobile device to form a two-way communication channel between the card and the mobile device. In so doing, for example, a non-powered card may communicate one, two, and/or three tracks of magnetic stripe information to a processor of a mobile device before and/or during a purchase transaction conducted by the mobile device.

A card (e.g., a powered card) may include a near-field communication device (e.g., an RFID) that may communicate with a contactless communication device of a mobile device. A powered card may, for example, include a battery, a processor, memory, and a manual input interface (e.g., one or more buttons) that may allow a user of the powered card to programmably communicate information to a mobile device. For example, a powered payment card may include a feature associated with a button that allows a user to, for example, pay with credit or pay with debit. Accordingly, for example, a powered payment card may communicate such a payment selection within discretionary data fields of one or more tracks of magnetic stripe data.

A powered card may, for example, include circuitry to simulate touch (e.g., a capacitance change) in order to form a contactless communication channel with a mobile device. Accordingly, for example, a powered card may be pressed against a touch-sensitive display of a mobile device and information may be communicated by the powered card to the mobile device through a series of card-simulated touches that may be detected by the touch-sensitive display of the mobile device and processed by a processor of the mobile device as data communicated by the powered card.

A powered card may, for example, include a light sensor to form a contactless communication channel with a mobile device. Accordingly, for example, a powered card may be pressed against a display of a mobile device and information may be communicated from the mobile device to the powered card through a series of light pulses generated by the display of the mobile device. A frequency, pulse width, and/or a pulse intensity of light pulses may, for example, be detected by a processor of a powered card as data communicated by a mobile device.

A powered card may, for example, include a light source (e.g., an LED) to form a contactless communication channel with a mobile device. Accordingly, for example, a powered card may emit varying light pulses from an LED that may be detected by a motion-capture device (e.g., a camera) of a mobile device as data communicated by the powered card. A powered card may, for example, include sound emission capabilities that may be detected by a microphone of a mobile device as data communicated by the powered card through a contactless communication channel. A mobile device may, for example, include sound emission capabilities that may be detected by a microphone of a powered card as data communicated by the mobile device through a contactless communication channel.

BRIEF DESCRIPTION OF THE DRAWINGS

The principles and advantages of the present invention can be more clearly understood from the following detailed description considered in conjunction with the following drawings, in which the same reference numerals denote the same structural elements throughout, and in which.

DETAILED DESCRIPTION OF THE INVENTION

Figure 1:
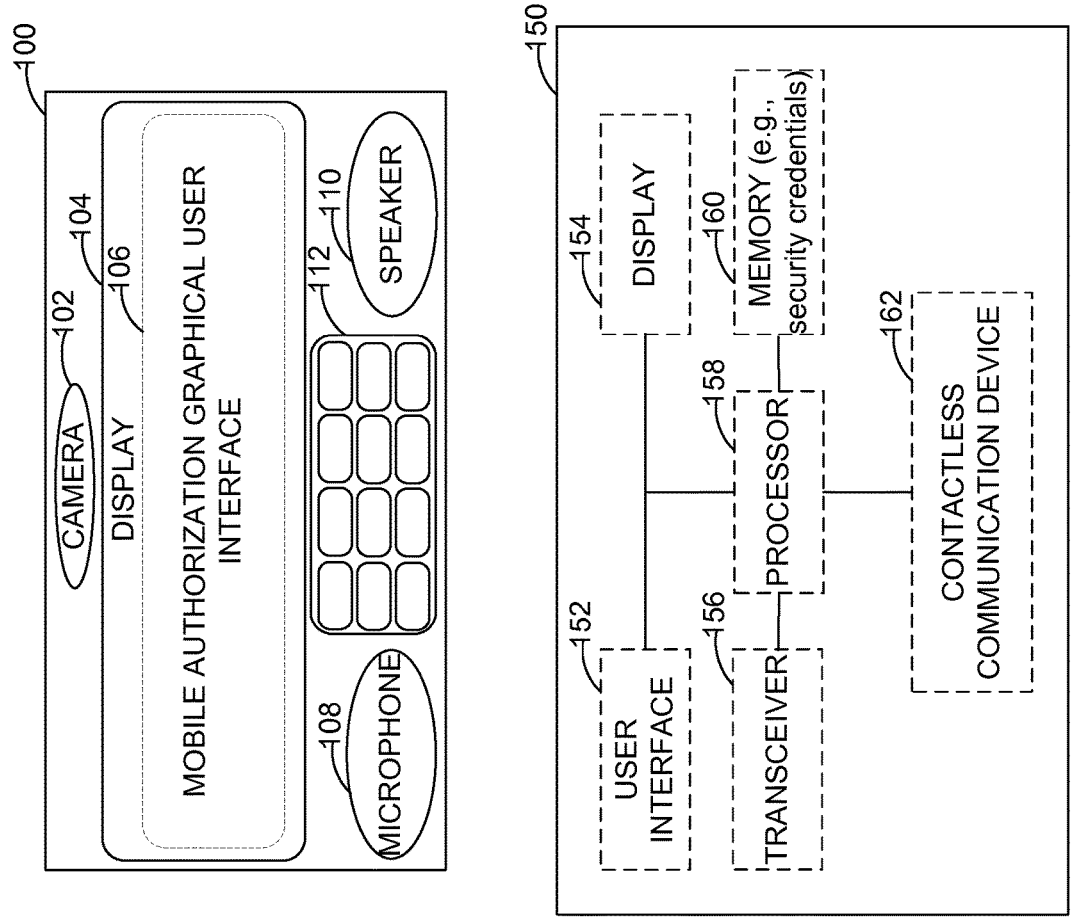
FIG. 1 is an illustration of mobile devices constructed in accordance with the principles of the present invention.

FIG. 1 shows mobile device 100. Mobile device 100 may be any mobile device, such as a mobile telephonic device (e.g., cell phone), a PDA, an electronic tablet, an MP3 player, or a locating device (e.g., a GPS device). Accordingly, mobile device 100 may be operated in a mobile environment while a user of mobile device 100 goes about his or her daily activities (e.g., driving, shopping, walking, dining, and exercising). In addition, for example, mobile device 100 may perform multiple functions simultaneously (e.g., a person may carry on a conversation while at the same time browsing and authorizing purchases on the Internet).

Mobile device 100 may include audio processing devices (e.g., microphone 108 and speaker 110). Accordingly, for example, mobile device 100 may receive voice commands from a user via microphone 108 and may process such commands to perform a function. For example, a user may place mobile device 100 into a desired operational mode by speaking a command into microphone 108 that is associated with the desired operational mode. In so doing, for example, mobile device 100 may engage in hands-free operation by receiving voice commands via microphone 108 and performing functions associated with the received voice commands.

Mobile device 100 may receive data input via microphone 108. For example, a voice-band modem may generate signals in a voice-band frequency range that may be received by microphone 108. A processor of mobile device 100 may interpret the received audible information as data signals and may process the data signals as, for example, data values and/or control data input.

Mobile device 100 may include camera 102. Camera 102 may capture one or more frames of video data and store the video data within a memory of mobile device 102. Accordingly, for example, a processor of mobile device 100 may receive one or more frames of video information via camera 102 and may process the video information as data values and/or control data input. In so doing, for example, mobile device 100 may receive optical information that may be sensed by camera 102 during a series of one or more video capture events that produce one or more frames of video information. The one or more frames of video information may contain one or more data elements (e.g., pixels) having properties (e.g., color, intensity, or contrast) that may be interpreted by a processor of mobile device 100 as data values and/or control data.

Mobile device 100 may include manual input interface 112. Manual input interface 112 may, for example, include keys and/or buttons that may be sensitive to manual input, such as a touch or an application of pressure. Accordingly, for example, a user of mobile device 100 may enter information into mobile device 100 via manual input interface 112 to cause a processor of mobile device 100 to enter a particular mode of operation. Manual interface 112 may, for example, be used for data entry (e.g., dialing a phone number or entering data as may be requested by mobile device 100) during a particular mode of operation of mobile device 100.

Mobile device 100 may include display 104. Display 104 may provide visible information that may be utilized by a user during interaction with mobile device 100. A portion or all of display 104 may be touch sensitive such that objects making contact with display 104 or objects coming within a proximity of display 104 may be detected by a processor of mobile device 100. Accordingly, for example, mobile authorization graphical user interface 106 may be provided by display 104 so that graphical information may be displayed to solicit and/or receive data entry from a user. In so doing, for example, touch-sensitive graphical user interface devices such as radio buttons, alphanumeric input boxes, virtual buttons, pull-down menus, and navigational tools may be used for data entry to initiate, change, and/or support functions performed by mobile device 100.

FIG. 1 shows architecture 150. User interface 152 may, for example, be included within architecture 150 to allow user interaction with architecture 150. For example, a dedicated key pad or keyboard may be included within user interface 152 to allow alphanumeric data entry into architecture 150.

Architecture 150 may include one or more displays 154. Display 154 may, for example, be touch-sensitive. Accordingly, for example, display 154 may be utilized for alphanumeric data entry using virtual buttons that may be rendered onto touch-sensitive portions of display 154. In so doing, for example, touching virtual buttons that may be associated with alphabetic and numeric characters of display 154 may be detected by processor 158 as alphanumeric data entry.

Alphanumeric entry boxes may, for example, be rendered onto display 154. A user may, for example, activate a cursor within such an alphanumeric entry box by touching an area within the alphanumeric entry box. A user may utilize user interface 152 and/or a virtual keypad rendered onto display 154 to select alphanumeric characters to be placed within the alphanumeric entry box in accordance with a character position identified by an activated cursor within the alphanumeric entry box. In so doing, for example, processor 158 may receive alphanumeric characters as typed into a alphanumeric entry box of display 154 and may use such alphanumeric characters as data input.

Display 154 may, for example, provide data output from architecture 150. For example, display 154 may communicate data using a series of light pulses. Accordingly, for example, processor 158 may cause one or more portions of display 154 to produce light pulses having varying characteristics (e.g., duration, intensity, and frequency) that may communicate information via such light pulses. In so doing, for example, a device that may be sensitive to light pulses may receive information communicated by display 154 via light pulses having varying characteristics. Display 154 may, for example, communicate data using visual information that may be substantially static (e.g., a barcode).

Architecture 150 may include one or more transceivers 156. Transceiver 156 may communicate information to and/or may receive information from one or more devices. Transceiver 156 may, for example, communicate via a wireless interface with one or more cellular stations of a mobile network. Accordingly, for example, transceiver 156 may allow a mobile device (e.g., mobile device 100 of FIG. 1) to establish a communications channel with an associated cellular station. In so doing, for example, a mobile device (e.g., mobile device 100 of FIG. 1) may exchange information (e.g., voice, text, data, or multimedia) with one or more terrestrial networks (e.g., the internet or a payment network) via an associated cellular station. As per another example, transceiver 156 may exchange information with one or more other mobile devices via one or more associated cellular stations.

Transceiver 156 may, for example, communicate via a wireless interface with one or more mobile devices directly. Accordingly, for example, transceiver 156 may communicate with another mobile device without first accessing a mobile network via a cellular station of the mobile network. As per another example, transceiver 156 may, for example, communicate via a wireless interface with one or more network devices (e.g., a wireless access point) directly. Accordingly, for example, a mobile device (e.g., mobile device 100 of FIG. 1) may directly connect to a wired and/or a wireless network via any one or more wireless standards (e.g., Bluetooth or Wi-Fi) to exchange information with other devices that may be connected to the wired and/or wireless network. In so doing, for example, a wired and/or wireless network may be accessed by a mobile device without first accessing a mobile network via a cellular station of a mobile network.

Architecture 150 may include contactless communication device 162, which may communicate via any one or more contactless communication methodologies, such as for example, near field communications (e.g., RFID), Bluetooth, touch simulation, light pulsing (e.g., via an LED), and electromagnetic data communication (e.g., via a dynamic magnetic stripe communications device). Accordingly, for example, contactless communication device 162 may be compatible with any contactless device, such as for example, an RFID enabled payment card and a contactless reader (e.g., a magnetic stripe reader or an NFC reader).

A non-powered card may, for example, communicate with contactless communications device 162. Contactless communication device 162 may, for example, establish a carrier field (e.g., an RF field) that may be modulated by a device (e.g., an RFID tag) of a non-powered payment card. In so doing, for example, an RFID tag of a non-powered payment card may derive operational power from an RF field provided by contactless communications device 162 and may communicate information (e.g., one, two, and/or three tracks of magnetic stripe data) to contactless communication device 162 by modulating the RF field produced by contactless communications device 162.

A powered card may, for example, communicate with contactless communication device 162. A powered card may, for example, include a processor, a battery, a memory, wireless communication devices (e.g., a dynamic magnetic stripe communications device or RFID) and other electronics (e.g., buttons) that may allow a user to interact with the powered card to perform one or more functions. Accordingly, for example, a powered card may be used to communicate specific information to contactless communication device 162 by selective interaction with the buttons of the powered card. In so doing, for example, a powered card may be used to interactively communicate magnetic stripe information (e.g., one, two, and/or three tracks of magnetic stripe data) to contactless communication device 162 by sending a signal to a processor of a powered card (e.g., by pressing a button on the powered card) to initiate such communications.

Contactless communication device 162 may receive variable data sets from a powered card based upon, for example, manual input provided to a powered card. For example, a button associated with an on-line purchase may be pressed on the powered card that causes a variable data set (e.g., account number and expiration date) to be communicated from the powered card to contactless communication device 162.

Discretionary data may, for example, be communicated by a powered card based upon which button was pressed on the powered card. In so doing, for example, a security code (e.g., "111") may be communicated within a discretionary data field when a button associated with a particular feature (e.g., pay with credit) is pressed on the powered card. As per another example, a different security code (e.g., "222") may be communicated within a discretionary data field when a button associated with a different feature (e.g., pay with debit) is pressed on the powered card. A powered card may, for example, communicate a different security code no matter what feature may be selected on the powered card. Accordingly, for example, processor 158 may identify what type of device may be in communication with contactless communication device 162 by analyzing the data communicated to contactless communication device 162.

Any device having contactless communication capability may communicate with contactless communication device 162 to authorize functions that may be performed by a mobile device. An RFID enabled device (e.g., an RFID equipped automobile key) may, for example, communicate with contactless communication device 162 to authorize functions that may be performed by a mobile device (e.g., mobile device 100 of FIG. 1) on a device that may be controlled by the RFID enabled device (e.g., an automobile that corresponds to the RFID equipped automobile key). For example, processor 158 may execute an automobile application that may wirelessly communicate with an automobile to perform remote functions (e.g., start an engine of the automobile or unlock the driver's door). Through use of an RFID equipped key, for example, such functions may be authorized to be performed by a mobile device (e.g., mobile device 100 of FIG. 1) once the RFID equipped key has communicated the necessary security credentials (e.g., a key code) to an application running on a processor of the mobile device to establish that a one-to-one correspondence exists between the automobile and the RFID equipped key.

Architecture 150 may include memory 160 and/or processor 158 may include internal memory. Accordingly, for example, application code may be stored within memory 160 and/or processor 158 and executed by processor 158 in support of functions performed by architecture 150. For example, an application (e.g., a graphical user interface) may be executed by processor 158 and displayed onto display 154, which may be used to interact with a user of a mobile device (e.g., mobile device 100 of FIG. 1). Persons skilled in the art will appreciate that executable application code may be communicated to architecture 150 via any one or more interfaces of architecture 150 (e.g., user interface 152, display 154, transceiver 156, and/or contactless communication device 162).

Application data (e.g., security credentials) may be stored within memory 160 and accessed by processor 158 during operation. For example, security credentials may be stored within memory 160 and recalled by processor 158 to authorize a function that may be performed by processor 158 of a mobile device (e.g., mobile device 100 of FIG. 1). Accordingly, for example, processor 158 of a mobile device may challenge a user of the mobile device to produce security credentials to authorize any function that may be performed by the mobile device. A processor of the mobile device may, for example, validate the security credentials locally within the mobile device itself. Alternately, for example, security credentials may be forwarded to a network entity (e.g., an authorization server) for remote validation.

Figure 2:
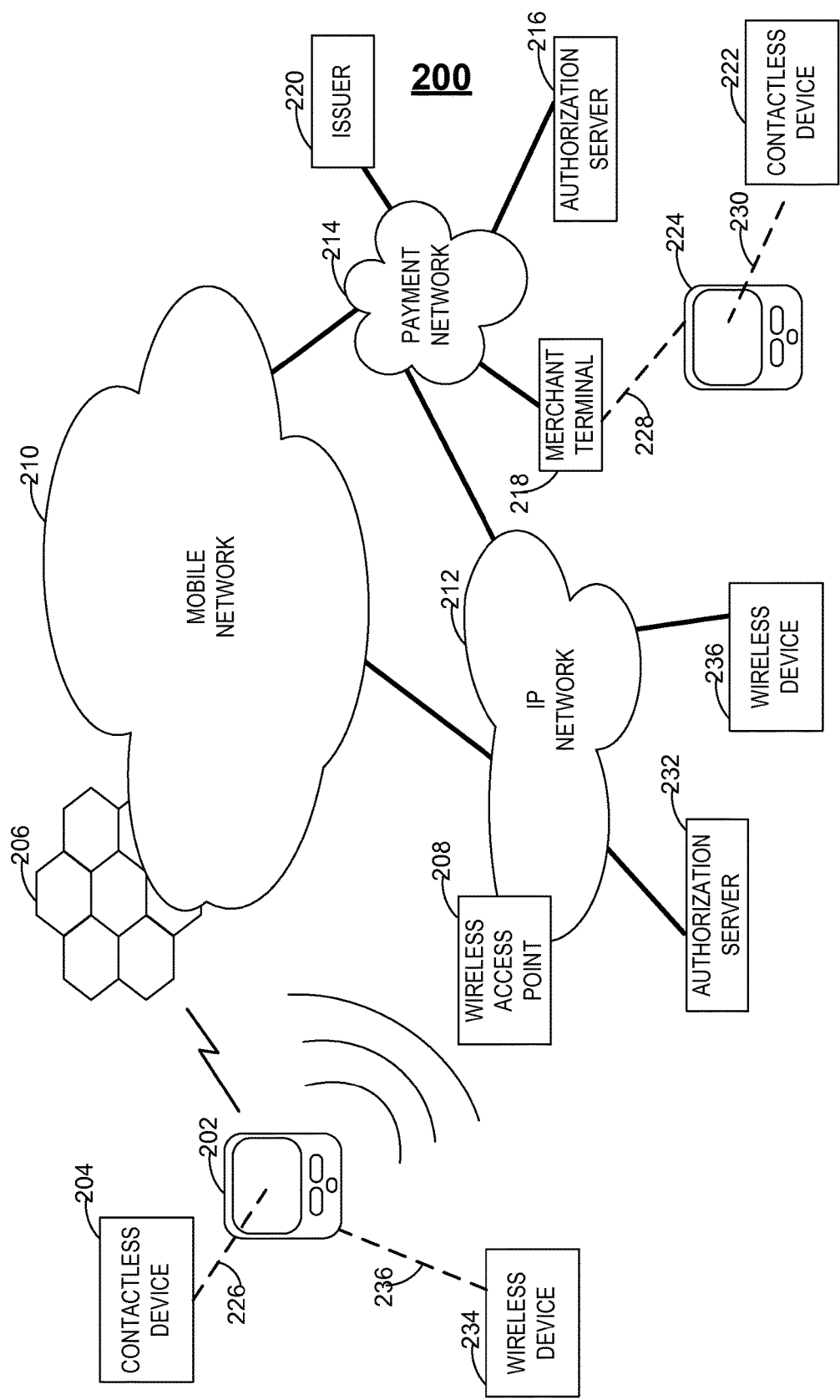
FIG. 2 is an illustration of a network topology constructed in accordance with the principles of the present invention.

FIG. 2 shows network topology 200 that may include, for example, mobile device 202 (e.g., a mobile telephonic device, a PDA, an electronic tablet, a laptop, a GPS unit, or an MP3 player). Mobile device 202 may, for example, include a contactless interface that may initiate, sustain, and/or terminate communication channel 226 between contactless device 204 and mobile device 202. Contactless device 204 and mobile device 202 may communicate via channel 226 using any number of contactless mediums, which may include for example, visible, audible, capacitive, electromagnetic, magnetic, and/or RF mediums.

Mobile device 202 may provide one or more transceivers that may communicate with one or more wired networks (e.g., IP network 212 and/or payment network 214) and/or one or more wireless networks (e.g., mobile network 210). Mobile device 202 may, for example, communicate with a cellular station over a wireless radio interface (e.g., a GSM air interface) that may be used by mobile device 202 to communicate information (e.g., voice and data) to cellular network access infrastructure 206 (e.g., one or more GSM base transceiver stations, base station controllers, and mobile switching centers). Persons skilled in the art will appreciate that cellular network access infrastructure 206 may utilize any multiple access architecture, such as for example, a code-division multiple access architecture and/or a time-division multiple access architecture.

Mobile device 202 may, for example, communicate with wireless access point 208 over a wireless interface (e.g., a Bluetooth interface or a Wi-Fi interface). Accordingly, for example, mobile device 202 may access one or more wired networks (e.g., IP network 212 and/or payment network 214) and/or one or more wireless networks (e.g., mobile network 210) without the need to first gain access to cellular network access infrastructure 206.

Contactless device 204 may, for example, be a powered card, a non-powered card (e.g., a powered payment card or a non-powered payment card) or any contactless enabled device (e.g., an RFID enabled device). Accordingly, for example, security credentials may be communicated via a contactless communication channel from contactless device 204 to mobile device 202 to authenticate a purchase transaction that may be performed by mobile device 202. In so doing, for example, items for purchase on IP network 212 (e.g., the internet) may be accessed by a browser of mobile device 202 via an access point (e.g., wireless access point 208 or cellular network access infrastructure 206), payment information may be retrieved from a memory of mobile device 202, a user of mobile device 202 may be challenged for security credentials (e.g., at least a portion of a payment account number and a card expiration date communicated to mobile device 202 from a payment card corresponding to the payment information retrieved from a memory of mobile device 202), such payment information may be authenticated by such security credentials, and such payment information may be communicated to network entities (e.g., issuer 220) to complete the purchase transaction.

Issuer 220 may, for example, contact authorization server 216 via a network (e.g., payment network 214) with payment information and security credentials received from mobile device 202 for authorization of a purchase. Once authorized, payment transaction information may be recorded onto a receipt that may be delivered to mobile device 202 via any one or more delivery options (e.g., via a short messaging service of mobile network 210 or an email delivery service of IP network 212). Mobile device 202 may allow a user to associate purchase categories (e.g., groceries, auto repair, or entertainment) to purchases transacted by the mobile device so that the user may receive a more detailed accounting of his or her expenditures on his or her receipt. Accordingly, for example, a user may enjoy a higher degree of integration such that a user may customize a level of detail provided on a receipt via mobile device 202.

A payment receipt may, for example, be provided to mobile device 202 as a proof-of-purchase object (e.g., a barcode) that may be provided to a display of mobile device 202 and read by other computing equipment (e.g., a barcode scanner) for proof-of-purchase confirmation.

A processor of mobile device 202 may, for example, authorize wireless device 234 to perform functions that may be authenticated by contactless device 204 (e.g., via security credentials communicated by contactless device 204 to a processor of mobile device 202). Accordingly, for example, a processor of mobile device 202 may require security credentials to be communicated by contactless device 204 via contactless communication channel 226 and based upon a validity of the security credentials communicated, the processor may communicate instructions to wireless device 234 via contactless communication channel 236 to perform some function. As per another example, a processor of mobile device 202 may communicate instructions (e.g., via wireless access point 208 or cellular network access infrastructure 206) to wireless device 234 (e.g., a car or a home) to perform a function (e.g., start the engine of the car) based upon a validity of security credentials communicated by contactless device 204.

A processor of mobile device 202 may, for example, locally validate security credentials communicated by contactless device 204. Alternately, for example, mobile device 202 may forward security credentials communicated by contactless device 204 to a network entity (e.g., authorization server 232) for remote validation.

A mobile device (e.g., mobile device 224) may, for example, include a contactless communication device (e.g., an RFID device) that may initiate, sustain, and/or terminate contactless communication channel 228 with merchant terminal 218. Accordingly, for example, a processor of mobile device 224 may communicate payment information to merchant terminal 218 to complete a financial transaction. In so doing, for example, a processor of mobile device 224 may receive payment information via contactless communication channel 230 from contactless device 222 (e.g., a powered or a non-powered card) and store the received payment information within a memory of mobile device 224. To complete a purchase transaction, contactless device 222 may, for example, be presented to mobile device 224 and may communicate security credentials (e.g., at least a portion of a payment card number and a cardholder's name) via contactless communication channel 230. A processor of mobile device 224 may validate the security credentials and may forward the payment information onto merchant terminal 218 to complete the purchase transaction.

Figure 3:
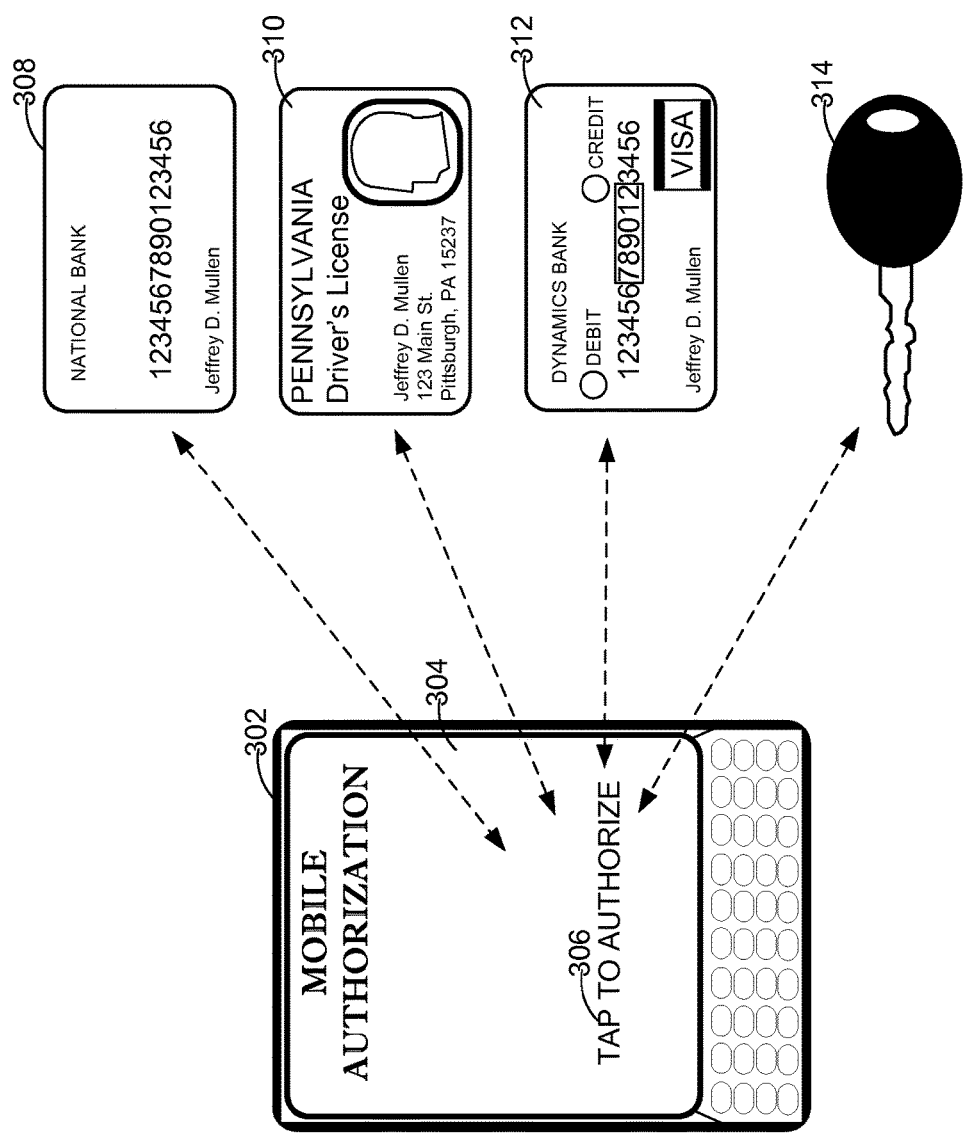
FIG. 3 is an illustration of a mobile authorization system constructed in accordance with the principles of the present invention.

FIG. 3 shows system 300, which may include mobile device 302 and contactless devices 308-314. Mobile device 302 may, for example, be a laptop computer, a PDA, a mobile telephonic device (e.g., a smartphone), an MP3 player, a GPS, or any other mobile device. Display 304 may be a touch-sensitive display (e.g., sensitive to a change in capacitance). Contactless devices may, for example, include non-powered payment card 308, identification card (e.g., driver's license 310), powered payment card 312, key 314, and any other device capable of communicating security credentials to mobile device 302 via a contactless communication channel that may be formed with mobile device 302.

Mobile device 302 and contactless devices 308-314 may each include a contactless communication device (e.g., an RFID device) that may communicate via a contactless communication channel that may be formed between mobile device 302 and contactless devices 308-314 after coming into proximity to one another.

Contactless devices 308-314 may, for example, be tapped onto display 304 of mobile device 302 to establish a proximity relationship that forms a communication channel with mobile device 302. As per another example, contactless devices 308-314 may be brought within a proximity distance (e.g., up to two inches) of mobile device 302 to establish a contactless communication channel with mobile device 302.

A processor of mobile device 302 may, for example, execute application code that may generate a graphical user interface (GUI) onto display 304 of mobile device 302. Message 306 of a GUI may invite a user of mobile device 302 to begin a mobile authorization by tapping a contactless device against display 304. As per another example, by tapping a contactless device against mobile device 302, a processor of mobile device 302 may autonomously determine that a mobile authorization is desired and may then generate a mobile authorization GUI onto display 304.

Mobile device 302 may, for example, autonomously determine a type of contactless device that may be tapped against it. For example, a processor of mobile device 302 may receive security credentials that may be indicative of a non-powered payment card (e.g., security credentials received from non-powered payment card 308 may include at least a portion of a payment card number and a cardholder's name). As per another example, a processor of mobile device 302 may receive security credentials that may be indicative of a powered card (e.g., security credentials received from powered card 312 may contain a dynamically generated security code). Security credentials received from powered card 312 may, for example, include a dynamic security code that may change for each function authorized by powered card 312.

A contactless device (e.g., key 314) may, for example, be a key that may start the ignition of a car, open a door to a home, or open a safe deposit box. Key 314 may, for example, include a contactless communication device (e.g., an RFID device) that may communicate security credentials to a processor of mobile device 302. Once security credentials received from key 314 are validated, a processor of mobile device 302 may effect an operation that may eliminate the need to physically use key 314 to perform the operation (e.g., a user of mobile device 302 may remotely start the engine of the user's car by running an application on a processor of mobile device 302 to validate security credentials received from key 314 and wirelessly communicate with a wireless device of the user's car to start its ignition). As per an example, the user's physical key 314 may, for example, be locked inside the user's car, in which case the user may select another contactless device (e.g., identification card 310) to present to mobile device 302. Identification card 310 may, for example, communicate security credentials to a processor of mobile device 302 and once the processor authorizes the identify of the user of mobile device 302, mobile device 302 may, for example, wirelessly communicate with the user's car to unlock its doors so that the user may retrieve key 314 that may have been previously locked within the user's car.

Powered payment card 312 may, for example, include electronics to simulate a human touch (e.g., powered payment card 312 may generate a change in capacitance that may be sensed by display 304). Through a series of simulated touches, powered payment card 312 may communicate a series of data bits to display 304, which may then be processed by a processor of mobile device 302 as security credentials. In so doing, for example, a contactless communication channel may be established where data is transferred from powered payment card 312 to a processor of mobile device 302 via a series of simulated touches to authorize a function to be performed (or commanded to be performed) by a processor of mobile device 302.

Powered payment card 312 may, for example, include a light sensor. Accordingly, for example, powered payment card 312 may be sensitive to light pulses generated within a region of display 304. The light sensor of powered payment card 312 may receive a series of light pulses, which may be construed by a processor of powered payment card 312 as data generated by a processor of mobile device 302. In so doing, for example, powered payment card 312 may receive an optical data stream represented by a series of light pulses generated by display 304. As such, a two-way communication channel may be formed, where simulated touches may generate a data stream from powered payment card 312 to mobile device 302 and light pulses may generate a data stream from mobile device 302 to powered payment card 312.

Mobile device 302 may, for example, include a motion-capture device (e.g., a camera). Identification card (e.g., driver's license 310) may, for example, include a barcode. Accordingly, for example, a contactless communication channel may be formed between identification card 310 and mobile device 302 where a camera of mobile device 302 may capture an image of the barcode of identification card 310. In so doing, for example, a processor of mobile device 302 may analyze the barcode image and extract information from the barcode image that may be construed by the processor as security credentials that when validated, may authorize a processor of mobile device 302 to perform (or cause to perform) any function.

As per another example, a user's photograph may appear on identification card 310. Accordingly, for example, a camera of mobile device 302 may capture an image of the picture and a processor of mobile device 302 may construe the captured image as a security credential. In so doing, for example, a processor of mobile device 302 may compare a scanned image of a user's picture to an image contained within a memory of mobile device 302 (or contained within a memory of a remote authorization server) for authorization. As per yet another example, a user may snap a picture of himself or herself with a camera of mobile device 302 so that a processor of mobile device 302 may scan the snapped picture for authorization purposes.

Mobile device 302 may, for example, require authorization before being activated for use. Accordingly, for example, a processor of mobile device 302 may require a password to be entered and verified before a processor of mobile device 302 may unlock functions available to be performed by mobile device 302. In so doing, for example, one or more contactless devices 308-314 may be presented to mobile device 302 and security credentials may be communicated by the one or more contactless devices 308-314 in lieu of providing a password to mobile device 302. Upon validation of the security credentials, a processor of mobile device 302 may unlock those functions that may be available to be executed by the processor of mobile device 302.

Figure 4:
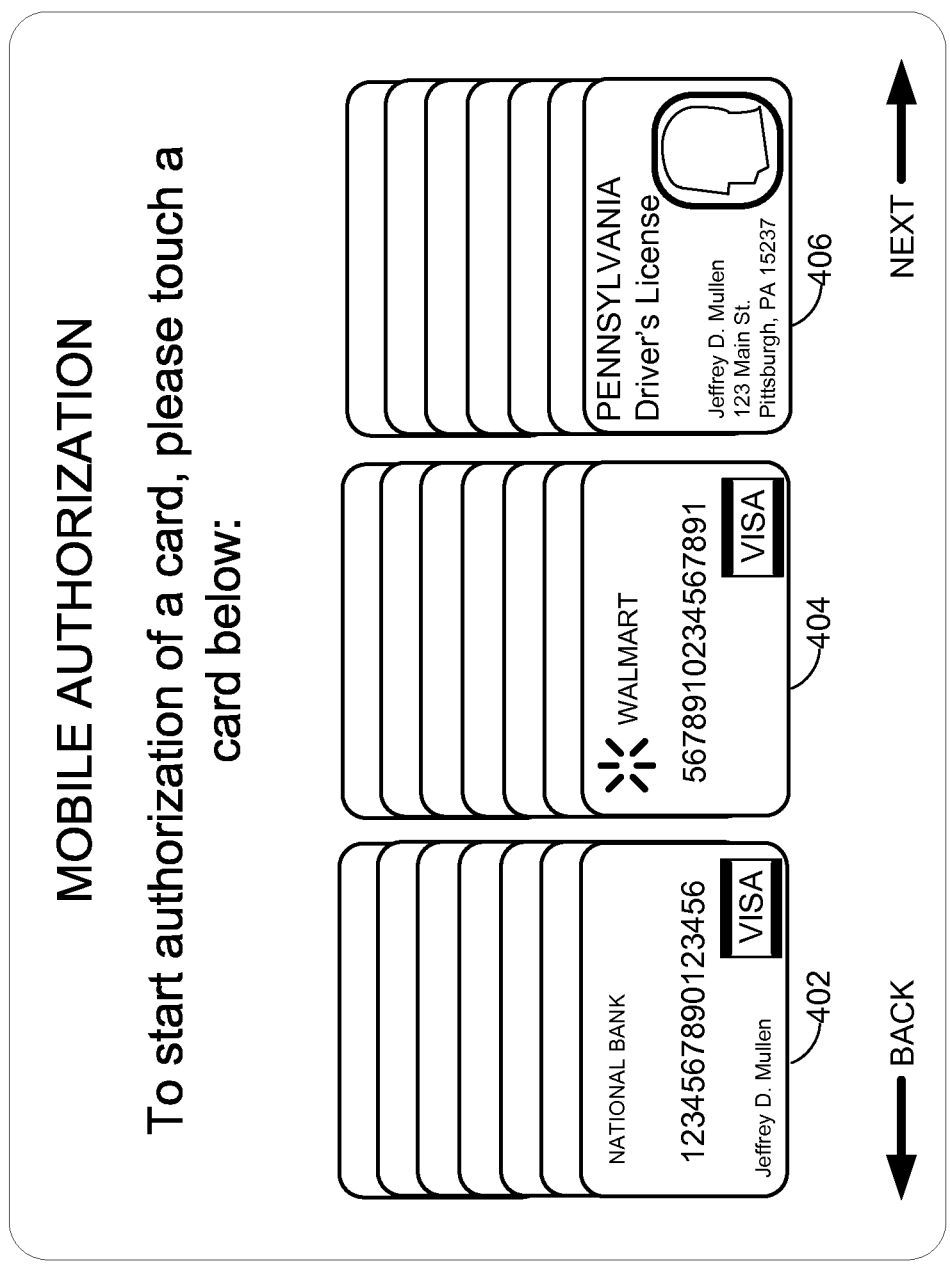
FIG. 4 is an illustration of a display screen constructed in accordance with the principles of the present invention.

FIG. 4 shows GUI 400, that may be generated by a processor of a mobile device and provided onto a display of the mobile device. GUI 400 may, for example, provide a summary of each card that may be available for use within a memory of the mobile device (e.g., each card may be displayed as virtual cards having visible and functional features that are substantially the same as their physical counterparts).

Physical card (e.g., payment card) information (e.g., track 1, track 2, and/or track 3 magnetic stripe data) may be communicated by the physical card to the mobile device via a contactless communication channel and such information may be displayed within a virtual card (e.g., virtual payment card 402) as summary information that may be associated with the physical payment card. A payment card number communicated to a processor of a mobile device may, for example, include issuer identification as well as an issuing network identifier. Accordingly, for example, a processor of a mobile device may analyze the payment card number received from a physical payment card and may render a portion or all of the identifying information associated with the payment card number onto virtual payment card 402. In so doing, for example, issuer identification as well as a logo representative of an issuing network identifier may be rendered onto virtual payment card 402. Other virtual payment cards may, for example, be sorted behind virtual payment card 402 in virtually any order (e.g., most popular to least popular, highest credit limit to lowest credit limit, or highest credit available to lowest credit available). Other virtual cards (e.g., virtual gift card 404 and virtual driver's license 406) may be stored within a memory of a mobile device as well.

Figure 5:
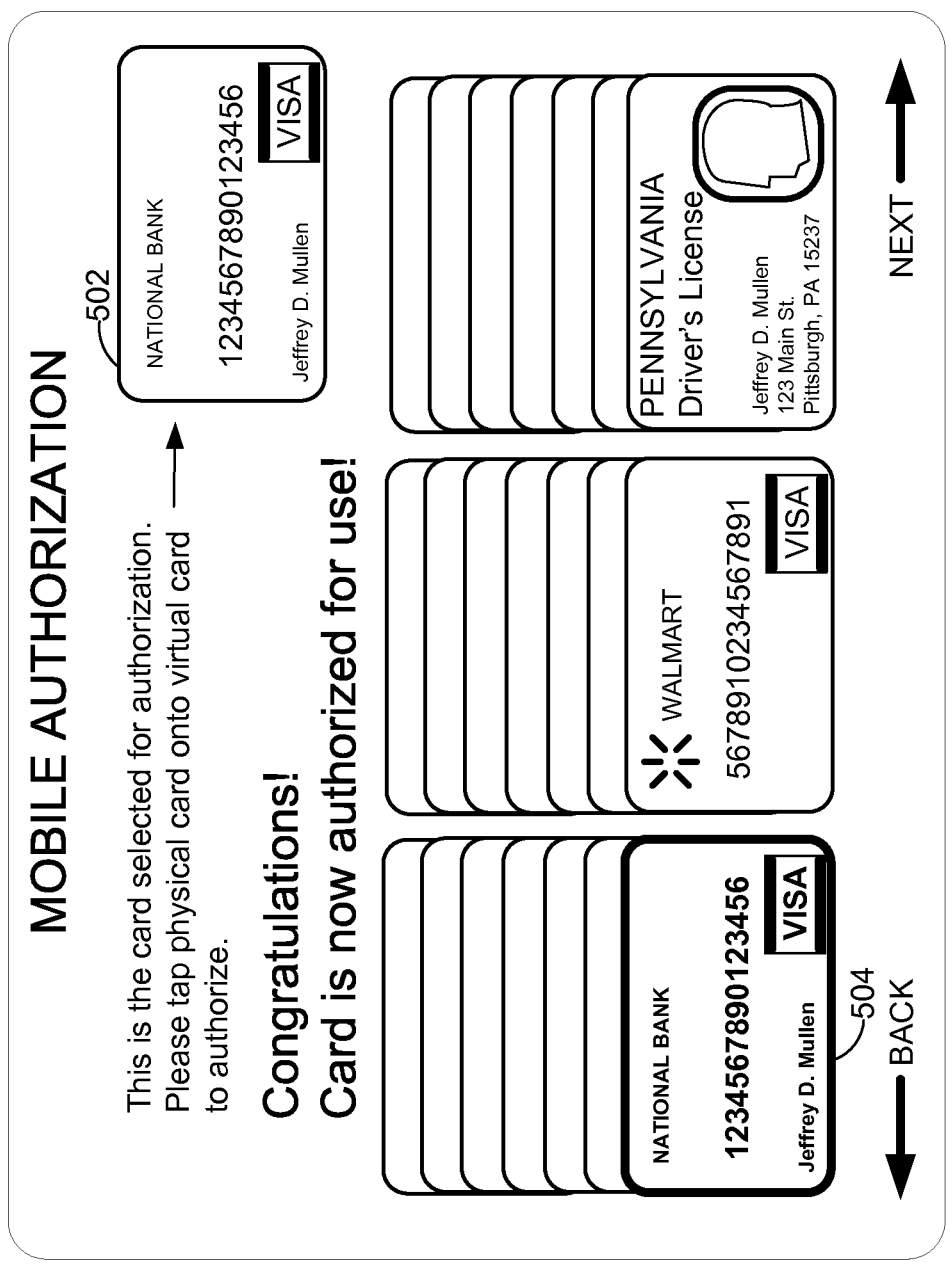
FIG. 5 is an illustration of a display screen constructed in accordance with the principles of the present invention.

FIG. 5 shows GUI 500, that may be generated by a processor of a mobile device and provided onto a display of the mobile device. GUI 500 may, for example, allow a selection of a virtual card contained within a memory of a mobile device to be authorized for use by its physical counterpart. Accordingly, for example, a user may touch anywhere within the vicinity of virtual card 504 as it is being displayed by GUI 500. Such a selection may be verified by highlighting attributes of a selected card (e.g., highlighting an outline of virtual card 504) and by displaying the selected virtual card within verification region 502. In so doing, for example, a user of a mobile device may view a virtual card that is selected for authorization (e.g., as viewed within region 502) so that the user may retrieve the physical card that corresponds to the virtual card that is to be authorized.

Once retrieved, a user may tap the physical card against region 502. Accordingly, for example, a contactless communication channel (e.g., an RFID communication channel) may be formed between the physical card and the mobile device, such that security credentials may be communicated from the physical card to the mobile device via the contactless communication channel to authorize virtual payment card 502 for use. In so doing, for example, a physical card may communicate security credentials (e.g., at least a portion of a payment card number of the physical card and/or a cardholder's name) to a processor of the mobile device and the processor may compare the received security credentials to security credentials stored within a memory of the mobile device that may be associated with virtual payment card 502. If the processor of the mobile device determines that the received security credentials match at least a portion of the security credentials associated with virtual payment card 502, then virtual card 502 may be authorized for use.

Figure 6:
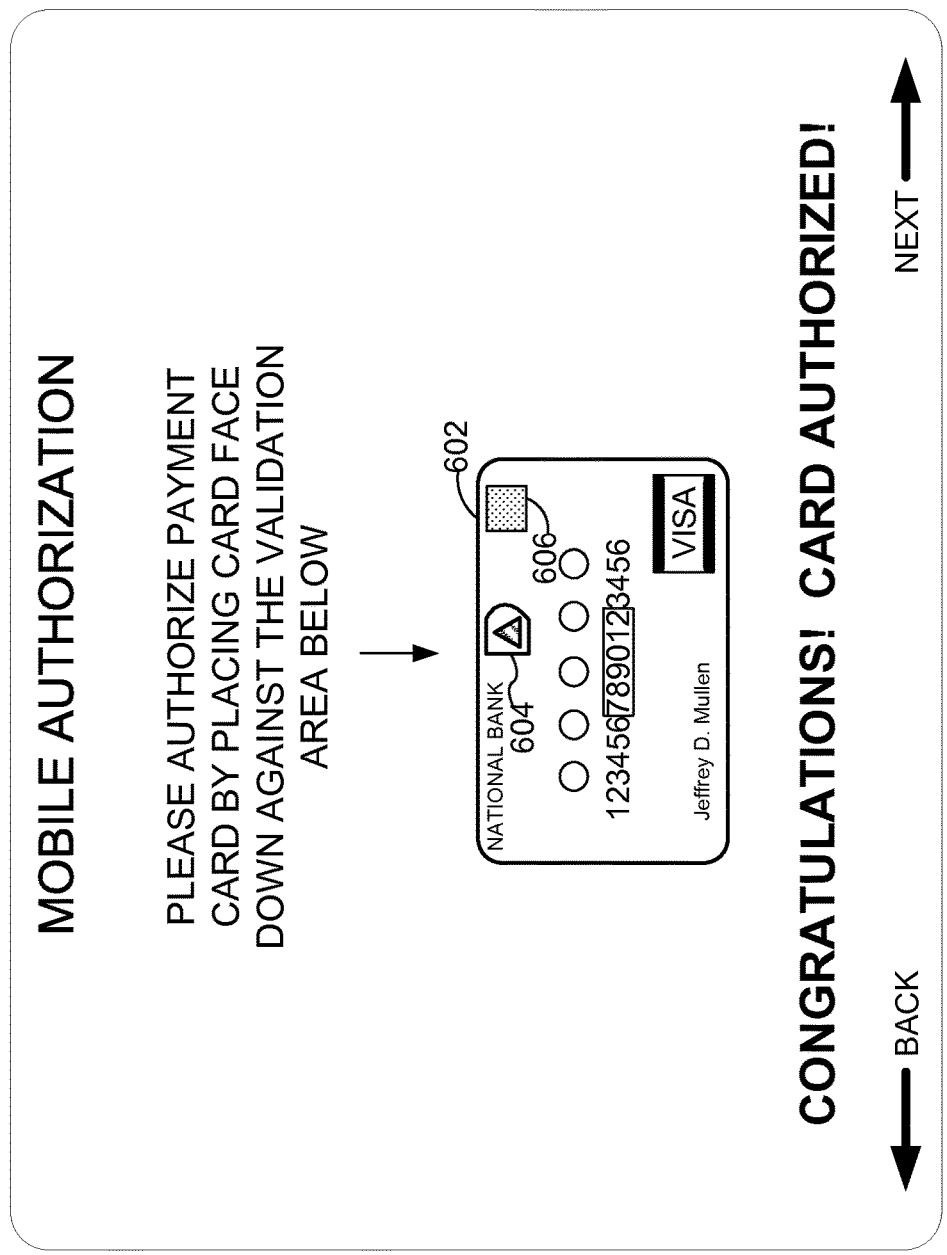
FIG. 6 is an illustration of a display screen constructed in accordance with the principles of the present invention.

FIG. 6 shows GUI 600, that may be generated by a processor of a mobile device and provided onto a display of the mobile device. GUI 600 may, for example, allow the authorization of a virtual card via an alternate contactless communication channel. For example, GUI 600 may display a virtual payment card (e.g., virtual payment card 602) in a region within GUI 600 that may provide a touch-sensitive area 604 and area 606 that may be capable of producing light pulses having varying characteristics (e.g., intensity, pulse width, and/or color).

A user's physical card that corresponds to virtual payment card 602 may, for example, be a powered card having touch-simulation electronics and a light sensor. Accordingly, for example, the user's physical card may be pressed against region 602, such that the touch simulation electronics of the physical card aligns with touch-sensitive portion 604 and the light sensor of the physical card aligns with portion 606. In so doing, for example, a contactless communication channel may be formed between the user's physical card and the mobile device, such that data may be communicated from the user's physical card to the mobile device through a series of simulated touches generated by the physical card and sensed at portion 604 by a processor of the mobile device. Such communicated data may be construed by a processor of the mobile device as security credentials communicated by the user's physical card.

Security credentials that may be communicated (e.g., via a capacitive, visible, audible, electromagnetic, magnetic, or RFID-based contactless communication channel) to a mobile device by a powered payment card may, for example, include a dynamic security code that may change with each use. Accordingly, for example, a network entity (e.g., an authorization server) may be synchronized with the user's powered payment card, such that when a dynamic security code of the powered payment card changes, so does the corresponding dynamic security code of the authorization server. In so doing, for example, a dynamic security code received by a mobile device from a powered payment card during authorization of virtual payment card 602 may be communicated by a processor of the mobile device to an authorization server for verification that the dynamic security code matches the dynamic security code maintained by the authorization server. If so, virtual payment card 602 may be authorized for use by the mobile device (e.g., payment information associated with virtual payment card 602 may be communicated by the mobile device to complete a purchase transaction).

Figure 7:
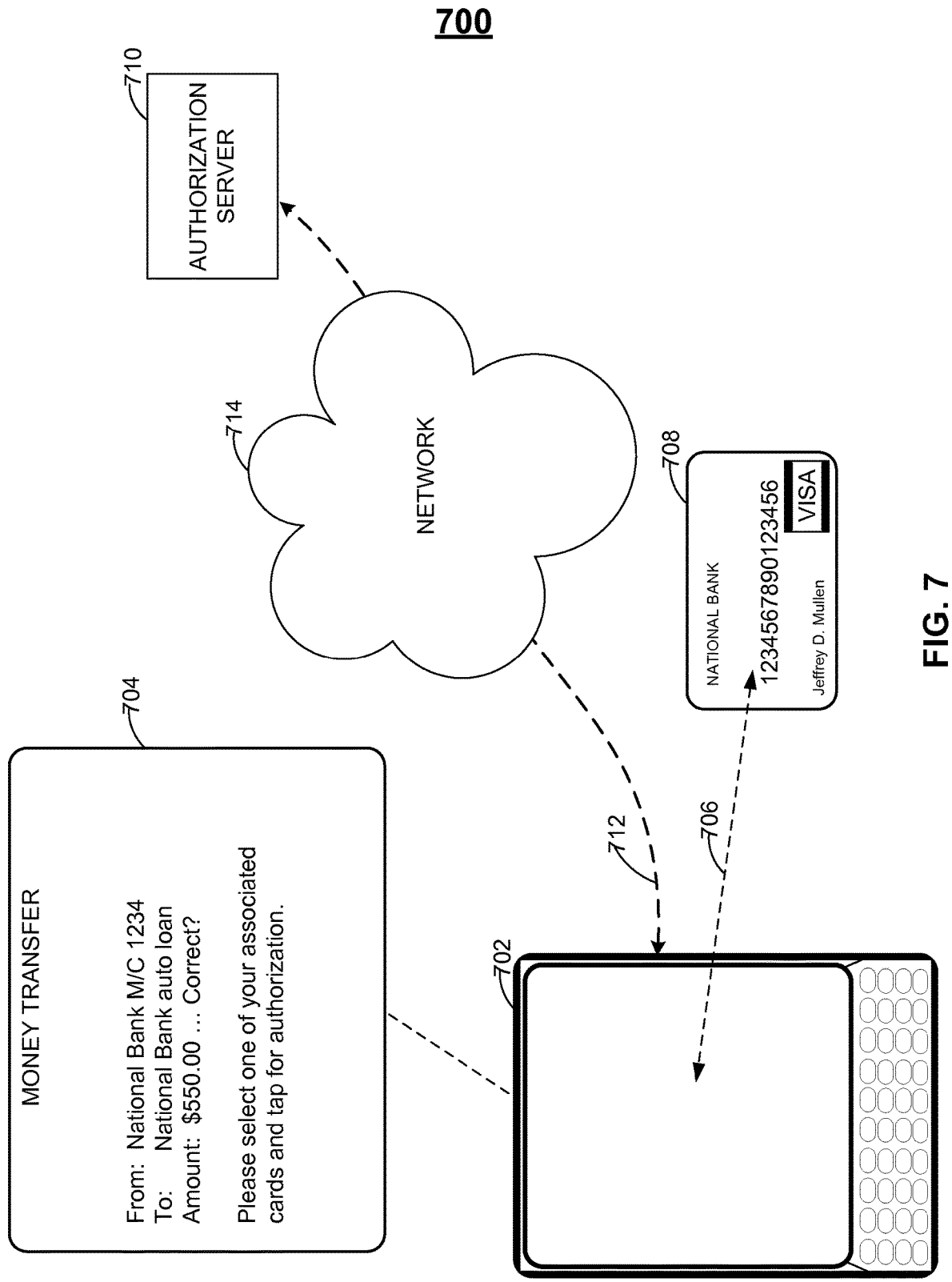
FIG. 7 is an illustration of a mobile authorization system constructed in accordance with the principles of the present invention.

FIG. 7 shows system 700 that may include mobile terminal 702, payment card 708, network 714 and authorization server 710. A processor of mobile device 702 may, for example, execute an application (e.g., GUI 704) that allows a user of mobile device 702 to perform any financial account management function (e.g., change from paper statements to e-statements, transfer money from one account to another or open a checking account).

Prior to authorizing the financial account management function, GUI 704 may challenge a user of mobile device 702 to tap a card against mobile device 702 that may be associated with the transaction. Accordingly, for example, a payment card (e.g., payment card 708) that may be associated with the financial accounts used for the financial account management function may be used as a security credential to authorize the transaction. In so doing, for example, security credentials communicated by payment card 708 to mobile device 702 via contactless communication channel 706 (e.g., an RFID communication channel) may be relayed by mobile device 702 to authorization server 710 via communication channel 712 for authorization of the financial account management function. Once authorized, a processor of mobile device 702 may receive the authorization from authorization server 710 and may contact other network entities (e.g., a payment server of network 714) to complete the financial account management function.

Payment card 708 need not be directly related to the financial accounts involved with a financial account management function. Instead, authorization server 710 may, for example, maintain links between various financial accounts that may be owned by a user of a mobile device. Accordingly, for example, while payment card 708 may not be used as the source account from which money is to be transferred to an auto loan account, payment card 708 may nevertheless be linked with the source account (e.g., M/C 1234). In so doing, for example, authorization server 710 may recognize the link between payment card 708 and the source account (e.g., M/C 1234) and may authorize the money transfer due to the recognized link.

Payment card 708 may, for example, be a powered payment card. Accordingly, for example, a dynamic security code may be communicated from payment card 708 to a processor of mobile device 702 (e.g., via a discretionary data field of a magnetic stripe message communicated by payment card 708) along with other identifying information (e.g., at least a portion of a dynamic payment card number or a cardholder's name). In so doing, for example, the dynamic security code and/or other optional identifying information may serve as the security credential that authorizes mobile device 702 to perform the requested function. The dynamic security code and/or other optional identifying information may, for example, be relayed to authorization server 710. Accordingly, for example, authorization server 710 may analyze the security code and any other optional identifying information to determine whether the requested function is to be authorized. If so, the authorization may be communicated by authorization server 710 to a processor of mobile device 702 via communication channel 712 so that the function may be completed.

Figure 8:
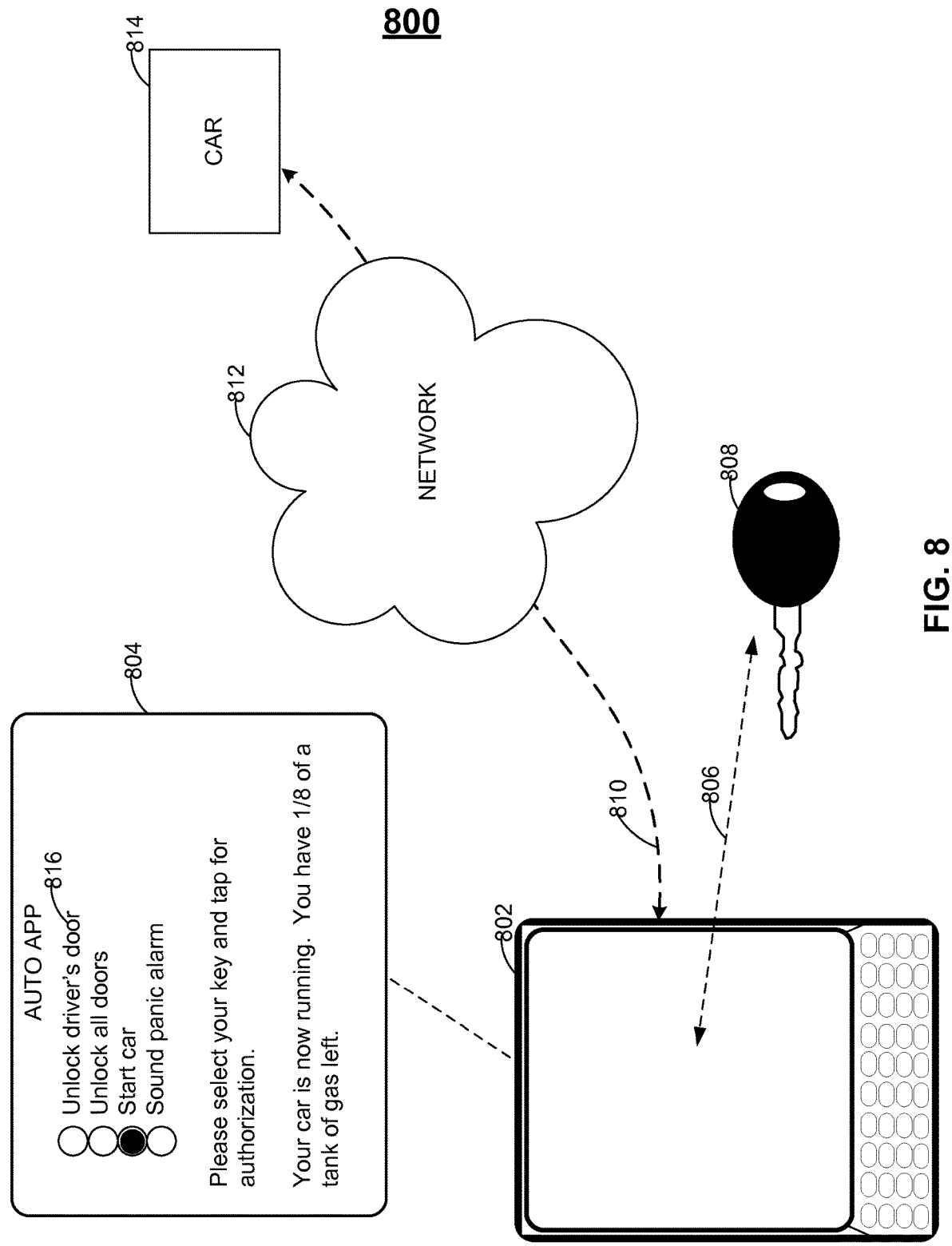
FIG. 8 is an illustration of a mobile authorization system constructed in accordance with the principles of the present invention.

FIG. 8 shows system 800 that may include mobile terminal 802, key 808, network 812 and car 814. A processor of mobile device 802 may, for example, execute an automobile application (e.g., GUI 804) that may allow a user of mobile device 802 to establish wireless link 810 between car 814 and mobile device 802. Accordingly, for example, a user of mobile device 802 may communicate wireless commands to car 814 via wireless communication channel 810.

A user may, for example, start his or her car from the convenience and warmth of the user's office at work when temperatures outside may warrant a time period within which car 814 may need to warm up. Accordingly, for example, a user may start his or her car via commands communicated by a processor of mobile device 802 to car 814 prior to leaving the office for the day. In so doing, for example, a processor of mobile device 802 may require authorization to issue the command, in which case the user may be challenged to present key 808 within a communication distance from mobile device 802 to form contactless communication channel 806. Security credentials may, for example, be communicated from key 808 to a processor of mobile device 802 via contactless communication channel 806 and the processor may compare the received security credentials to security credentials stored within a memory of mobile device 802 (or a remote authorization server). If a match is found, for example, a processor of mobile device 802 may be authorized to issue one or more commands 816 to car 814.

A wireless device of car 814 may, for example, communicate to a processor of mobile device 802 via communication channel 810. Accordingly, for example, once a command is authorized and sent to a wireless device of car 814 by a processor of mobile device 802, the wireless device of car 814 may respond with an acknowledgment that the command (e.g., "Start car") was executed. A wireless device of car 814 may, for example, provide status to a display of mobile device 802. Accordingly, for example, a wireless device of car 814 may report a gasoline level status to mobile device 802 via communication channel 810 so that the user of mobile device 802 may know that leaving car 814 running for a length of time may deplete the car's gas reserves.

Figure 9:
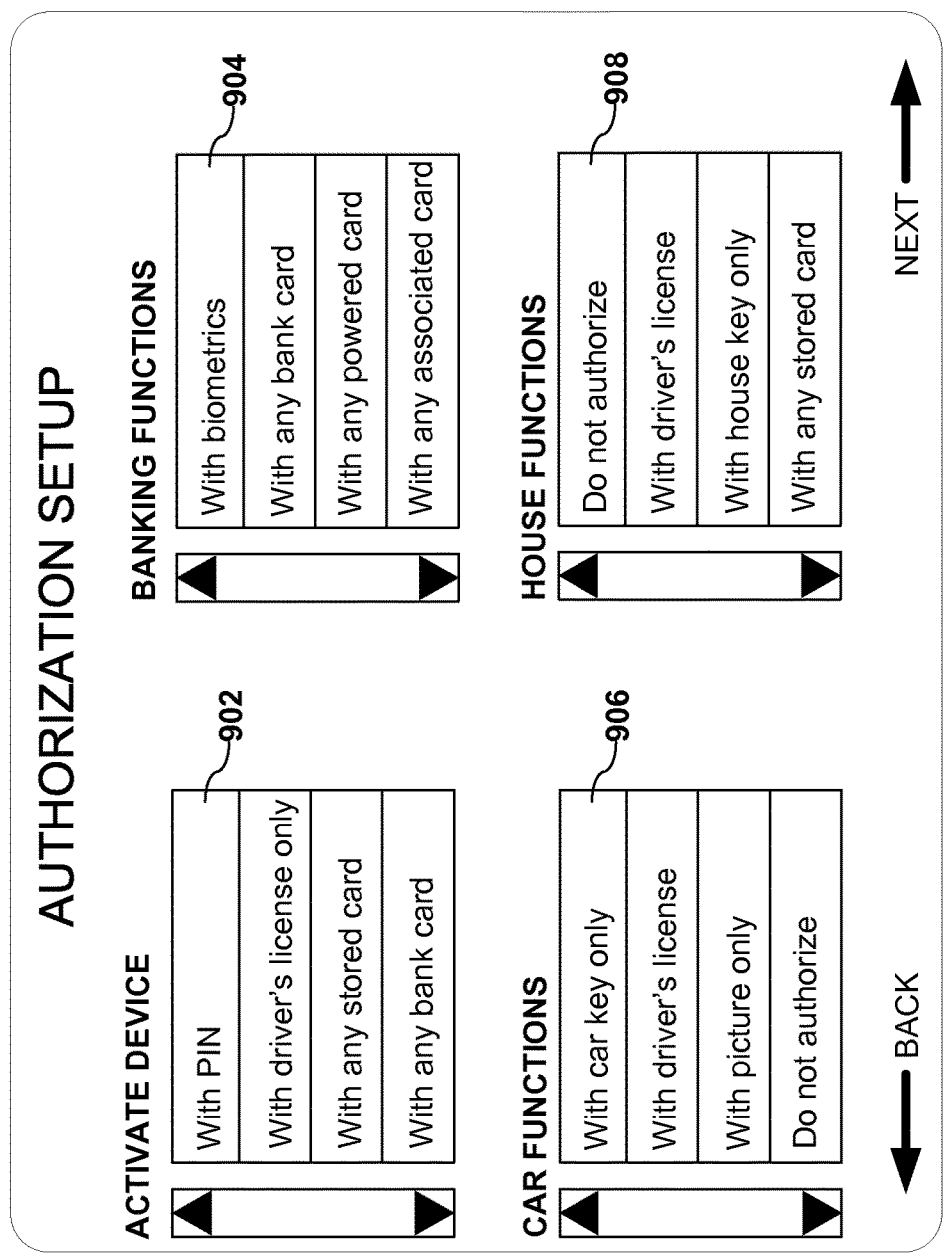
FIG. 9 is an illustration of a display screen constructed in accordance with the principles of the present invention.

FIG. 9 shows GUI 900, that may be generated by a processor of a mobile device and provided onto a display of the mobile device. GUI 900 may, for example, allow a user of a mobile device to determine how certain functions that may be performed by the mobile device may be authorized. GUI 900 may, for example, provide authorization options 902 to determine how the mobile device itself may be authorized for use. A PIN, for example, may be required to be entered in order to activate the mobile device for use. As per another example, a memory of the mobile device may contain information associated with any physical card. Accordingly, for example, authorization to activate the mobile device may require that a user produce a physical card (e.g., a driver's license) that may correspond to a virtual card (e.g., a virtual driver's license) that may be stored within a memory of the mobile device. Alternately, for example, a physical card that corresponds to any virtual card or any virtual bank card stored within a memory of the mobile device may be used to authorize the mobile device for use.

Banking functions performed by a mobile device may, for example, be authorized as defined by options 904. A mobile device may, for example, be equipped with scanning capability, such that biometrics (e.g., fingerprints) may be taken from the user of the mobile device and verified before banking functions may be authorized. As per another example, a dynamic security code communicated to a processor of a mobile device by a powered payment card via a contactless communication channel may authorize banking functions to be performed by the mobile device.

Functions associated with remote operation of a car may, for example, be authorized as defined by options 906. A mobile device may, for example, be equipped with a camera, such that only when a picture of an authorized user is taken with the camera and verified by a processor of the mobile device will that user be able to issue remote commands (e.g., unlock driver's door) to the user's car.

Other functions, such as remote house functions, may be authorized as defined by options 908. For example, a garage door of a user's house may be commanded to be opened by the user's mobile device, but only if a house key communicates security credentials (e.g., a key code) to a processor of the user's mobile device via a contactless communication channel. Alternately, for example, a user may disable any house functions to be conducted by the user's mobile device.

Figure 10:
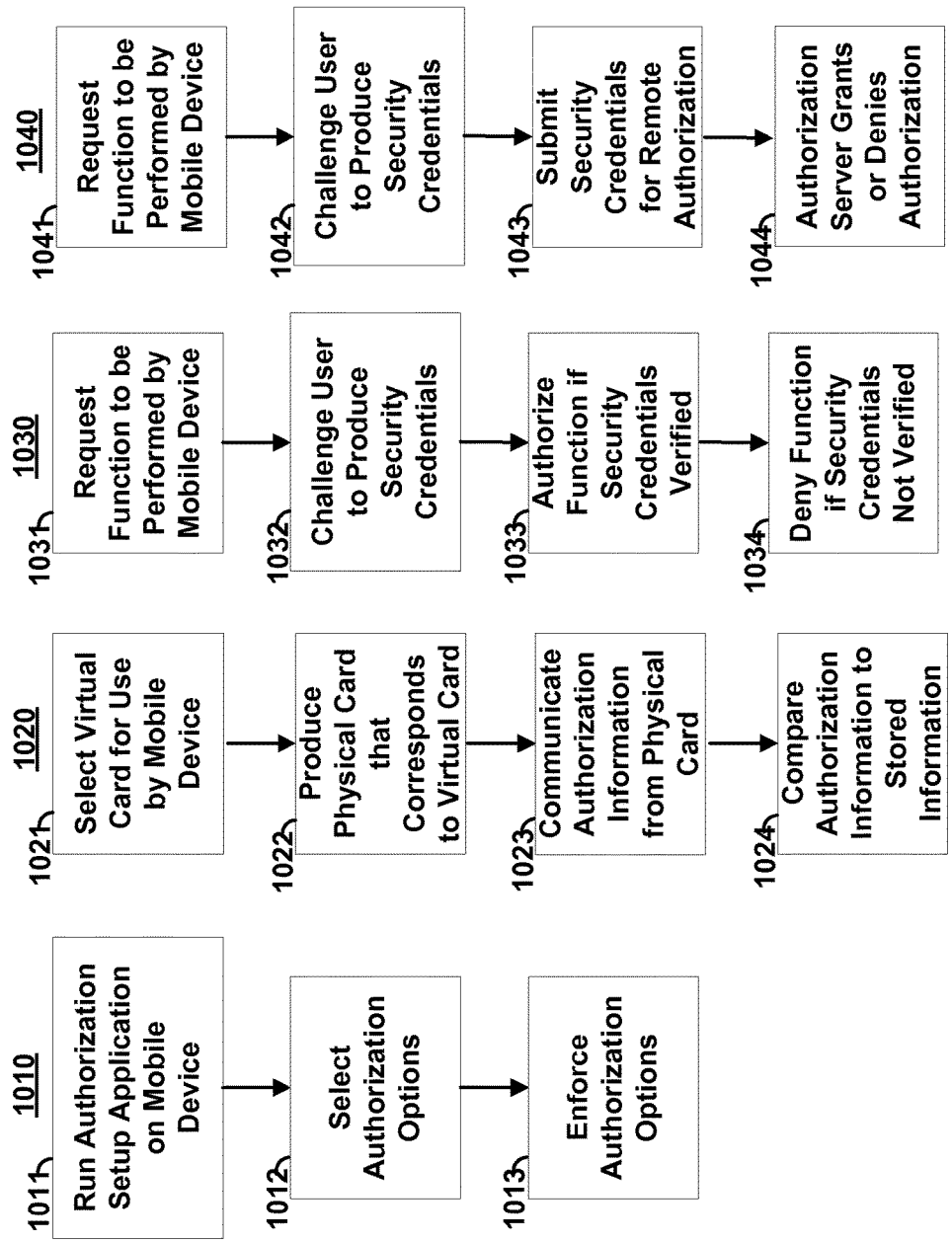
FIG. 10 is a flow chart of processes constructed in accordance with the principles of the present invention.

FIG. 10 shows flow charts for process sequences 1010-1040. Process sequence 1010 may, for example, execute an authorization setup application (e.g., a GUI) on a mobile device that allows a user of the mobile device to select authorization options (e.g., as in steps 1011-1012) to be enforced by a processor of the mobile device (e.g., as in step 1013). For example, banking functions that may be performed by a mobile device may first require that a physical bank card be placed in proximity to the mobile device so that the physical bank card may communicate security credentials to a processor of the mobile device via a contactless communication channel that may be formed between the physical banking card and the mobile device. In so doing, for example, a processor of the mobile device may compare the security credentials received from the physical card to security credentials stored within a memory of the mobile device (or remote authorization server). Upon a successful comparison, a processor of a mobile device may authorize banking functions to be performed by the mobile device.

A memory of a mobile device may, for example, contain a number of virtual cards that may correspond to information communicated to a processor of the mobile device via physical card counterparts to the virtual cards. Such virtual cards may, for example, be selected (e.g., as in step 1021 of sequence 1020) to perform a function in conjunction with the mobile device (e.g., payment information associated with a virtual payment card may be selected to complete a purchase transaction using the mobile device). In step 1022, a user of a mobile device may be required to produce a physical card that corresponds to the selected virtual card. A contactless communication channel (e.g., an RFID communication channel) may be formed between the physical card and the mobile device so that security credentials may be communicated from the physical card to a processor of the mobile device via the contactless communication channel (e.g., as in step 1023). In step 1024, a processor of a mobile device may compare the security credentials to security credentials stored within a memory of the mobile device (or remote authorization server) that corresponds to a physical card. Upon a favorable comparison, a processor of a mobile device may authorize the selected virtual card for use.

Any function (e.g., non-purchase transactions) that may be performed by a mobile device may be requested (e.g., as in step 1031 of sequence 1030) and challenged (e.g., as in step 1032 of sequence 1030). For example, a processor of a mobile device may be requested to perform any function (e.g., remotely start the engine of a user's car) and a processor of the mobile device may first require security credentials to be presented before the function may be performed. Security credentials may, for example, be any information that may be communicated to a mobile device by a contactless device (e.g., an RFID enabled ignition key) via a contactless communication channel. A processor of the mobile device may authorize the requested function if the security credentials are verified (e.g., as in step 1033) and may deny the requested function if the security credentials are not verified (e.g., as in step 1034).

In step 1041 of sequence 1040, a user of a mobile device may request a function to be performed by a mobile device. Upon receipt of security credentials communicated by a contactless communication device to a processor of the mobile device (e.g., as in step 1042), the security credentials may be forwarded (e.g., as in step 1043) to a remote authorization server for verification. In step 1044, the remote authorization server may communicate a message to a processor of the mobile device to either grant or deny authorization for the mobile device to perform the requested function.

Persons skilled in the art will appreciate that the present invention is not limited to only the embodiments described. Instead, the present invention more generally involves dynamic information and the exchange thereof. Persons skilled in the art will also appreciate that the apparatus of the present invention may be implemented in other ways than those described herein. All such modifications are within the scope of the present invention, which is limited only by the claims that follow.

What is claimed is:

1. A method, comprising:
    receiving first information from a contactless device;
    executing an application on a processor of a mobile device to perform a function;
    receiving, by said mobile device, second information from said contactless device via a contactless communication channel;
    confirming said received second information matches at least a portion of said received first information; and
    executing said function from said mobile device based on said confirmation, wherein said contactless device is operable to communicate said second information to a device other than said mobile device for performance of said function.

2. The method of claim 1, wherein said mobile device is a laptop.

3. The method of claim 1, wherein said mobile device is a PDA.

4. The method of claim 1, wherein said mobile device is a phone.

5. The method of claim 1, wherein said mobile device is an MP3 device.

6. The method of claim 1, wherein said mobile device is a GPS device.

7. The method of claim 1, wherein said contactless device is a non-powered card.

8. The method of claim 1, wherein said contactless device is a powered card.

9. The method of claim 1, wherein said contactless device is an automobile key.

10. The method of claim 1, wherein said contactless device is a home door key.

11. The method of claim 1, wherein said contactless device is a key to a safe deposit box.

12. The method of claim 1, wherein said contactless communication channel is an RFID communication channel.

13. The method of claim 1, wherein a camera of said mobile device establishes said contactless communication channel.

14. The method of claim 1, wherein said contactless device is a powered card, said mobile device and said powered card being brought within a proximity distance of up to two inches to establish said contactless communication channel.

15. The method of claim 1, wherein said contactless device is a powered card, said powered card simulating a series of touches to a display of said mobile device to establish at least a portion of said contactless communication channel.

16. The method of claim 1, wherein said contactless device is a powered card, said mobile device communicating an optical data stream to said powered card to establish at least a portion of said contactless communication channel.

17. The method of claim 1, wherein said first received information is stored on a memory of said mobile device.

18. The method of claim 1, wherein said first received information is stored on a memory of a remote authorization server.

19. The method of claim 1, wherein said contactless device is a non-powered card, said non-powered card providing said received second information to authorize a purchase transaction based on payment account information associated with said non-powered card.

20. The method of claim 1, wherein said function is executed by a device external to said mobile device.

* * * * *